United States Patent
Matsue

(10) Patent No.: US 9,933,757 B2
(45) Date of Patent: Apr. 3, 2018

(54) SATELLITE RADIO-WAVE RECEPTION DEVICE, RADIO CLOCK, INFORMATION ACQUISITION METHOD, AND RECORDING MEDIUM

(71) Applicant: CASIO COMPUTER CO., LTD., Tokyo (JP)

(72) Inventor: Takeshi Matsue, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/381,847

(22) Filed: Dec. 16, 2016

(65) Prior Publication Data

US 2017/0185051 A1   Jun. 29, 2017

(30) Foreign Application Priority Data

Dec. 24, 2015  (JP) ................................ 2015-251029

(51) Int. Cl.
*G04R 20/06* (2013.01)
*G01S 19/14* (2010.01)
*G01S 19/30* (2010.01)

(52) U.S. Cl.
CPC .............. *G04R 20/06* (2013.01); *G01S 19/14* (2013.01); *G01S 19/30* (2013.01)

(58) Field of Classification Search
CPC ......... G04R 20/00; G04R 20/06; G01S 19/14; G01S 19/30

See application file for complete search history.

(56) References Cited

U.S. PATENT DOCUMENTS

| 5,847,680 A * | 12/1998 | McBurney | G01S 19/44 |
| | | | 342/357.27 |
| 7,348,921 B2 * | 3/2008 | Yu | G01S 19/24 |
| | | | 342/357.63 |
| 8,184,505 B1 * | 5/2012 | Wang | G01S 19/243 |
| | | | 342/357.63 |
| 9,182,238 B2 * | 11/2015 | Lau | G01S 19/34 |
| 9,317,017 B2 * | 4/2016 | Kato | G04R 20/04 |
| 2005/0174284 A1 * | 8/2005 | Abraham | G01S 19/24 |
| | | | 342/357.23 |

(Continued)

FOREIGN PATENT DOCUMENTS

JP   2009-036748 A   2/2009

*Primary Examiner* — Vit W Miska
(74) *Attorney, Agent, or Firm* — Scully, Scott, Murphy & Presser, P.C.

(57) ABSTRACT

A satellite radio-wave reception device includes a demodulator. A demodulator determines an assumption code, identifies a plurality of reception codes from a received radio wave, collates an assumption code in a deviation range, which is previously set with respect to reception timing of the reception codes, and each of the reception codes, holds information related to a collation result in each deviation amount with respect to the plurality of reception codes, determines one of correspondences and noncorrespondences, the number of which one is larger, as matching in each code block, and identifies a deviation amount in which the integrated value of matching corresponding to an integrated value of the number of matching codes in a plurality of code blocks in each deviation amount satisfies a predetermined matching condition.

20 Claims, 11 Drawing Sheets

(56) References Cited

U.S. PATENT DOCUMENTS

2008/0084336 A1* 4/2008 Wang ................... G01S 19/254
 341/51
2008/0304601 A1* 12/2008 Abraham ................ G01S 19/24
 375/340

* cited by examiner

| E(10) | 10 | 0 | 9 | 0 |
| --- | --- | --- | --- | --- |
| N(10) | 22 | 0 | 16 | 0 |
| F(10) | 0 | 2 | 2 | 4 |
| T(10) | 0 | 22 | 22 | 38 |
| E(200) | 22 | 0 | 1 | 0 |
| N(200) | 22 | 0 | 22 | 0 |
| F(200) | 0 | 22 | 22 | 42 |
| T(200) | 0 | 22 | 22 | 44 |

| E(10) | 231 | 0 | 148 | 0 |
| --- | --- | --- | --- | --- |
| N(10) | 440 | 0 | 320 | 0 |
| F(10) | 0 | 22 | 22 | 46 |
| T(10) | 0 | 440 | 440 | 760 |
| E(200) | 440 | 0 | 2 | 0 |
| N(200) | 440 | 0 | 440 | 0 |
| F(200) | 0 | 440 | 440 | 876 |
| T(200) | 0 | 440 | 440 | 880 |

SATELLITE RADIO-WAVE RECEPTION DEVICE, RADIO CLOCK, INFORMATION ACQUISITION METHOD, AND RECORDING MEDIUM

CROSS-REFERENCE TO RELATED APPLICATION

This application is based upon and claims the benefit of priority from the prior Japanese Patent Application No. 2015-251029, filed Dec. 24, 2015, the entire contents of which are incorporated herein by reference.

BACKGROUND OF THE INVENTION

The present invention relates to a satellite radio-wave reception device that receives a radio wave from a positioning satellite, a radio controlled watch, an information acquisition method, and a recording medium.

Conventionally, there is an electronic clock (radio controlled watch) having a function of keeping a counted date and time accurate by receiving a radio wave from a navigation satellite (positioning satellite) according to a global navigation satellite system (GNSS) and by acquiring date-and-time information. In this radio controlled watch, it is possible to keep a counted and displayed date and time accurate in each place in the world without manual operation of a user.

However, a load related to reception of a satellite radio wave is significantly high compared to a load related to counting or displaying of a date and time in an electronic clock. Thus, in a response to reception of a satellite radio wave, there is a problem that a size of a battery is increased and that a size and weight of an electronic clock is increased accordingly. Thus, conventionally, various technologies to reduce a power consumption related to reception of a satellite radio wave have been developed.

As such a technology of reducing power consumption, there is reduction of radio wave reception time. For example, in Japanese Patent Application Laid-Open No. 2009-36748, a technology of performing reception at transmission timing of a predetermined part including date-and-time information according to a format of a signal transmitted from a GPS satellite (navigation message) and of temporarily stopping the reception while unnecessary information is transmitted is disclosed. Here, in order to avoid erroneous identification of a date and time, parity data corresponding to a block including the predetermined part is calculated and consistency of reception data is checked.

However, when necessary time information is decrypted after identification of each received code and a collation operation such as a parity check is further performed, there is a problem that a load of processing in radio wave reception is eventually increased and that memory capacity or power consumption is increased.

SUMMARY OF THE INVENTION

An embodiment of the present invention is to provide a satellite radio-wave reception device, a radio controlled watch, an information acquisition method, and a program with which it is possible to accurately calculate information related to time while controlling an unnecessary processing load or power consumption.

To achieve the above, an embodiment of the present invention is a satellite radio-wave reception device including: a receiver configured to receive a radio wave that includes a code signal and that is transmitted from a satellite; and a demodulator configured to identify an array of a plurality of codes included in the code signal included in the radio wave received by the receiver and reception timing of the array, wherein the plurality of codes is respectively inverted in a case where a value of each code determined according to contents indicated by the code signal corresponds to a predetermined condition in each code block including a predetermined number of codes, and the demodulator generates a collation code string including an assumption code determined without consideration for the inversion and in accordance with contents assumed to be indicated by the code signal according to a type of a satellite and reception timing related to the radio wave received by the receiver, identifies, as a reception code, each of the plurality of codes from the received radio wave, collates the assumption code in a deviation range, which is previously set with respect to reception timing of the identified reception codes, and the reception codes, holds, with respect to the plurality of reception codes, information related to a collation result indicating a correspondence or a noncorrespondence between the collated reception codes and assumption code in each deviation amount in the deviation range, determines one of correspondences and noncorrespondences, the number of which one is larger, as matching in each code block, calculates the integrated value of matching corresponding to a value in which the number of matching in a plurality of code blocks is integrated with respect to each deviation amount, and identifies a deviation amount, in which the integrated value of matching satisfies a predetermined matching condition, as a matching deviation amount.

DETAILED DESCRIPTION

In the following, an embodiment of the present invention will be described with reference to the drawings.

Figure 1:
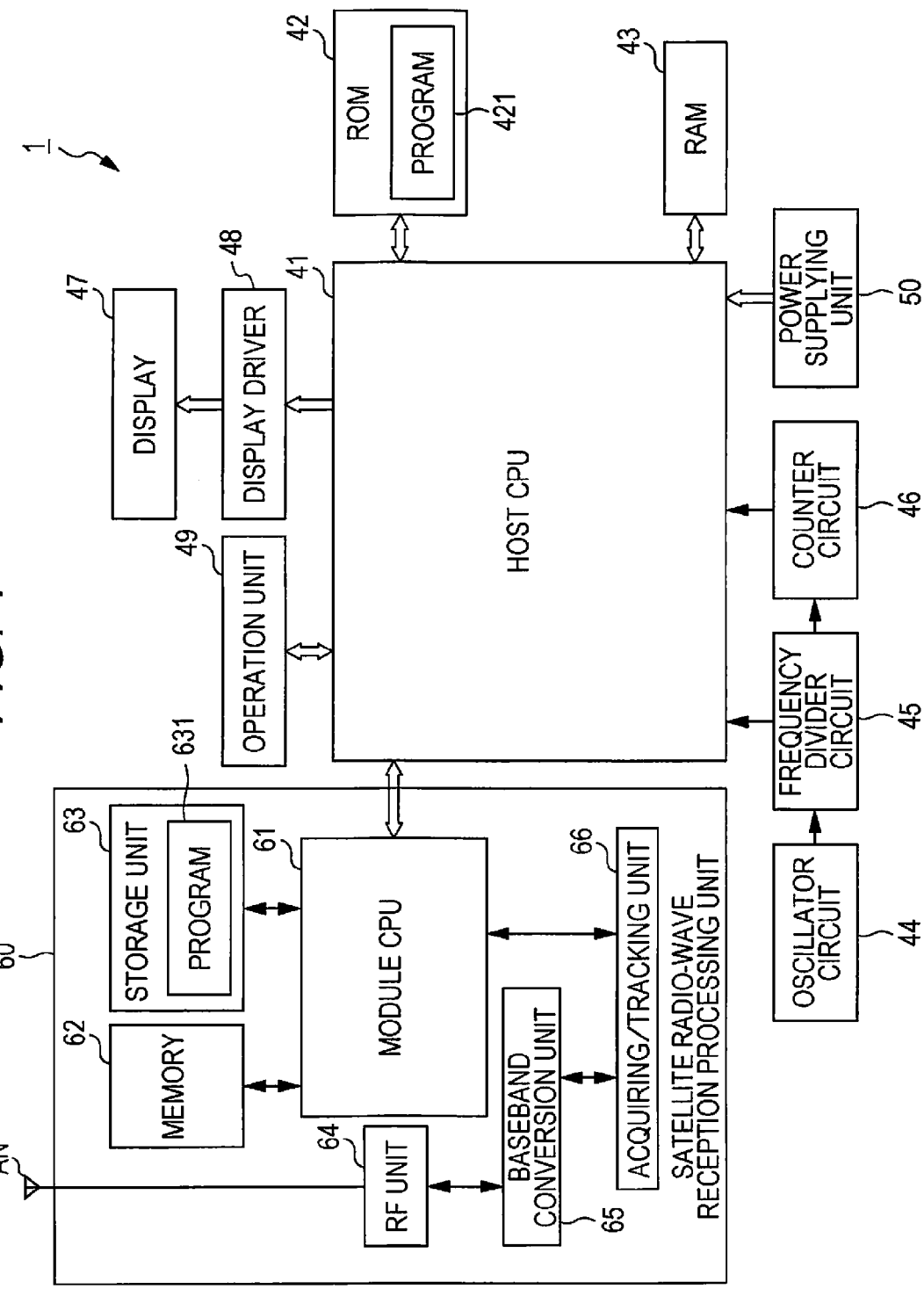
FIG. 1 is a block diagram illustrating a functional configuration of an electronic clock of an embodiment of the present invention.

FIG. 1 is a block diagram illustrating a functional configuration of an electronic clock 1 that is an embodiment of a radio controlled watch of the present invention.

This electronic clock 1 is a radio controlled watch that can perform acquisition of date-and-time information or measurement of a position by at least receiving a radio wave from a positioning satellite according to a global positioning system (GPS) of the US (hereinafter, referred to as GPS satellite) and demodulating a signal.

The electronic clock 1 includes a host central processing unit (CPU) 41 as a processor, a read only memory (ROM) 42, a random access memory (RAM) 43, an oscillator circuit 44, a frequency divider circuit 45, a counter circuit 46 as a counter, a display 47 as a display, a display driver 48, an operation unit 49, a power supplying unit 50, a satellite radio-wave reception processing unit 60 as a satellite radio-wave reception device, an antenna AN, and the like.

The host CPU 41 is a processor that performs various kinds of calculation processing and performs integrated control of a whole operation of the electronic clock 1. The host CPU 41 reads a control program from the ROM 42, loads the program into the RAM 43, and displays a date and time, performs calculation control related to various functions, or various kinds of operation processing such as displaying. Also, the host CPU 41 operates the satellite radio-wave reception processing unit 60 to receive a radio wave from a positioning satellite, and calculates date-and-time information or positional information calculated based on received contents.

The ROM 42 is a mask ROM, a rewritable non-volatile memory, or the like and stores a control program or initial setting data. In the control program, a program 421 related to control of various kinds of processing to calculate various kinds of information from a positioning satellite is included.

The RAM 43 is a volatile memory such as an SRAM or a DRAM. The RAM 43 provides a memory space for operation to the host CPU 41, stores temporary data, and stores various kinds of setting data. The various kinds of setting data includes a home city setting related to selection of a time zone in counting and displaying of a date and time, and a setting indicating whether to apply summer time. A part or whole of the various kinds of setting data stored in the RAM 43 may be stored in a non-volatile memory.

The oscillator circuit 44 generates and outputs a predetermined frequency signal. As the oscillator circuit 44, for example, a crystal oscillator is used.

The frequency divider circuit 45 divides a frequency signal input from the oscillator circuit 44 into a signal in a frequency used by the counter circuit 46 or the host CPU 41 and outputs the signal. It may be possible to change a frequency of this output signal based on a setting by the host CPU 41.

The counter circuit 46 counts a current date and time by counting the number of times of input of a predetermined frequency signal (clock signal) input from the frequency divider circuit 45 and by adding the number to an initial value. As the counter circuit 46, what changes a value, which is stored into a RAM, with software may be included or a dedicated counter circuit may be included. The date and time counted by the counter circuit 46 may be any of time accumulated from predetermined timing, a UTC date and time (coordinated universal time), a date and time of a previously-set home city (local time), and the like. Also, the date and time counted by this counter circuit 46 are not necessarily held in a year-month-day format or an hour-minute-second format. An amount of deviation (rate) between a clock signal input from the frequency divider circuit 45 into the counter circuit 46 and accurate elapse of time in a day varies according to an operation environment such as temperature and is usually within ±0.5 seconds.

The display 47 includes a display screen such as liquid crystal display (LCD) or an organic electro-luminescent (EL) display and performs a digital display operation related to a date and time or various functions by one of a dot matrix system and a segment system or by a combination thereof.

The display driver 48 outputs a driving signal corresponding to a type of a display screen to the display 47 based on a control signal from the host CPU 41 and performs a display on the display screen.

The operation unit 49 receives input operation from a user and outputs an electric signal corresponding to the input operation to the host CPU 41 as an input signal. This operation unit 49 includes, for example, a push-button switch or a crown-winding switch.

Alternatively, a touch sensor is provided as the operation unit 49 in a manner laminated on a display screen of the display 47 and the display screen may be made to function as a touch panel that outputs an operation signal corresponding to detection of a contact position or a contact mode related to contact operation of a user which detection is by the touch sensor.

The power supplying unit 50 includes a battery and supplies power for an operation of the electronic clock 1 to each unit in predetermined voltage. As batteries of the power supplying unit 50, here, a solar panel and a secondary battery are used. The solar panel generates an electromotive force with incident light and supplies power to each unit such as the host CPU 41. In a case where surplus power is generated, the solar panel stores the power into the secondary battery. On the other hand, in a case where power that can be generated with an amount of light incident to the solar panel from the outside is in short with respect to power consumption, power is supplied from the secondary battery. Alternatively, a primary battery such as a button battery may be used as a battery.

By identifying and acquiring a C/A code (pseudo random noise) unique for each positioning satellite in synchronization with a radio wave from the positioning satellite through the antenna AN, the satellite radio-wave reception processing unit 60 receives the radio wave, demodulates and decrypts a navigation message transmitted from the positioning satellite, and calculates necessary information. The satellite radio-wave reception processing unit 60 includes a module CPU 61 as a processor in a demodulator, a memory 62, a storage unit 63, an RF unit 64 as a receiver, a baseband conversion unit 65, an acquiring/tracking unit 66, and the like. Note that the demodulator is configured from the module CPU 61, the memory 62, the storage unit 63, the baseband conversion unit 65, the acquiring/tracking unit 66, and the like.

The module CPU 61 is a processor that controls an operation of the satellite radio-wave reception processing unit 60 according to an input of a control signal or setting data from the host CPU 41. The module CPU 61 reads a necessary program or setting data from the storage unit 63, operates the RF unit 64, the baseband conversion unit 65, and the acquiring/tracking unit 66, receives a radio wave from each received positioning satellite, performs demodulation, and calculates date-and-time information.

The module CPU 61 can function as a collation code string generation unit, a code identification unit, a collation unit, a result holding unit, a matching determination unit, and a deviation amount identification unit that perform, other than acquisition of date-and-time information by decoding of a received radio wave, correspondence detection by serially comparing and collating a demodulated reception code with a code string for comparison and collation (collation code string), which string is predicted and previously generated, without performing decoding and that identify a deviation amount from an assumed reception date and time (reception timing).

The memory 62 is a RAM that provides a memory space for operation to the module CPU 61 in the satellite radio-wave reception processing unit 60. Also, in the memory 62, code string data generated for comparison and collation with a received code string is temporarily stored.

The storage unit 63 stores various kinds of setting data related to GPS positioning or a history of positioning and date-and-time information acquisition. As the storage unit 63, various kinds of non-volatile memories such as a flash memory and an electrically erasable and programmable read only memory (EEPROM) are used. Data stored in the storage unit 63 includes precise orbit information (ephemeris) and predicted orbit information (almanac) of each positioning satellite or a date and time and a position of previous positioning are included. Also, in the storage unit 63, data related to a time zone of each place in the world or information of execution of summer time is stored as a time difference table. When positioning is performed, local time information such as a time difference from coordinated universal time (UTC) at standard time in a calculated current position, or summer-time execution information is specified with reference to this time difference table.

Also, in the storage unit 63, a program to perform positioning and to specify this local time information or a program 631 to receive and calculate date-and-time information is stored and is read is executed by the module CPU 61.

The RF unit 64 receives a satellite radio wave in an L1 band (1.57542 GHz in GPS satellite), selectively allows passage of a signal transmitted from the positioning satellite (code signal), amplifies the signal, and converts the signal into an intermediate-frequency signal. The RF unit 64 includes a low noise amplifier (LNA), a bandpass filter (BPF), a local oscillator, a mixer, and the like.

The baseband conversion unit 65 applies a C/A code of each positioning satellite to the intermediate-frequency signal converted in the RF unit 64, and acquires a code string (reception code string and array of plurality of code) according to a baseband signal, that is, a navigation message (in predetermined format).

The acquiring/tracking unit 66 identifies a type of a C/A code included in a received radio wave and a phase of the C/A code by calculating a correlation value between the intermediate-frequency signal converted in the RF unit 64 and a C/A code in each phase of each positioning satellite and by specifying a peak thereof. Also, in order to continuously acquire, according to the identified C/A code and a phase thereof, a code string of a navigation message transmitted from a positioning satellite corresponding to the C/A code, the acquiring/tracking unit 66 gives a feedback or the like of positional information to the baseband conversion unit 65, demodulates the received radio wave, and identifies each code (reception code).

To this satellite radio-wave reception processing unit 60, power is directly supplied from the power supplying unit 50 and on and off thereof are switched by a control signal of the host CPU 41. That is, in a period other than a period in which radio wave reception and from a positioning satellite and a calculation operation related to date-and-time reception or positioning are performed, power of the satellite radio-wave reception processing unit 60 is turned off separately from the host CPU 41 or the like that is constantly operated.

Next, a format of a navigation message transmitted from the GPS satellite will be described.

In the GNSS, a plurality of positioning satellites is separately arranged on a plurality of orbits and it is made possible to simultaneously receive, at an observation point, transmission radio waves of a plurality of different positioning satellites. Thus, it is possible to calculate information related to current positions of the positioning satellites or date-and-time information, which is transmitted from the positioning satellites reception from which is possible, from four or more positioning satellites (three on the assumption of ground) and to determine a positional coordinate and a date and time of an observation point in a three dimensional space based on these pieces of calculated data and a deviation in acquisition timing, that is, a difference in propagation time (distance) from the positioning satellites. Also, when date-and-time information from one positioning satellite is calculated, it is possible to calculate a current date and time in a margin of error (in about 100 msec or less) of propagation time from the positioning satellite.

A code string (navigation message) indicating information related to a date and time, information related to a position of a satellite, status information such as a health state of a satellite, and the like is transmitted in a spread spectrum manner from a positioning satellite by being phase-modulated with the C/A code (pseudo random noise). A signal transmission format (format of navigation message) is determined for each positioning system.

Figure 2:
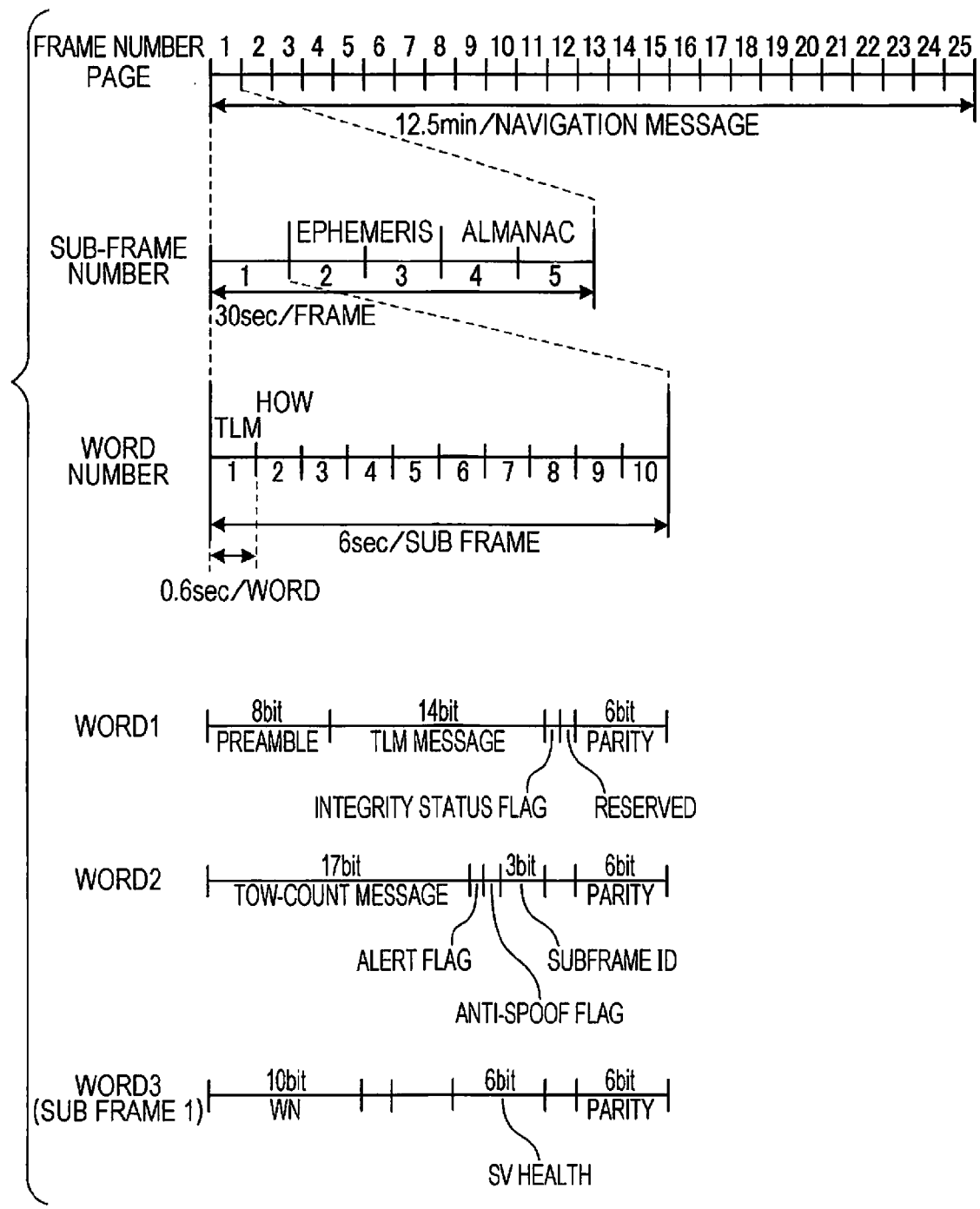
FIG. 2 is a view for describing a format of a navigation message transmitted from a GPS satellite.

FIG. 2 is a view for describing a format of a navigation message transmitted from a GPS satellite.

In the GPS, total 25 pages of frame data in a 30-second unit are transmitted from each GPS satellite, whereby all pieces of data are transmitted in a cycle of 12.5 minutes. In the GPS, a unique C/A code is used for each GPS satellite. In this C/A code, 1023 codes (chip) are arrayed in 1.023 MHz and are repeated in a cycle of 1 msec. A head of this chip is synchronized with an internal clock of a GPS satellite. Thus, by detection of a shift in this phase for each GPS satellite, propagation time, that is, a phase shift (pseudo distance) corresponding to a distance from the GPS satellite to a current position is detected.

Each piece of frame data includes five sub frames (six second each). Moreover, each sub frame includes 10 words (0.6 second each, WORD1 to WORD10 in order). Each word has a 30-bit length. That is, codes of 50 bits are transmitted in each second from the GPS satellite.

Data formats of each of WORD1 and WORD2 are identical in all sub frames. In WORD1, a 14-bit telemetry message (TLM Message) is included after a preamble (Preamble) that is an 8-bit fixed code string, and 6-bit parity data is arranged after that with a 1-bit integrity status flag and a 1-bit reserved bit therebetween. In WORD2, an Alert flag and an Anti-spoof flag are indicated in one bit each after 17-bit TOW-Count (also called Z count) indicating elapsed time in a week. Then, a sub frame ID (Subframe-ID) indicating a number of a sub frame (cycle number) is indicated in three bits and 6-bit parity data is arrayed with two bits for consistency of parity data therebetween.

Data in and after WORD3 varies depending on a sub frame. In WORD3 in a sub frame 1, 10-bit WN (week number) is included at a head. In each of sub frames 2 and 3, an ephemeris (precise orbit information) is mainly included. In a part of a sub frame 4 and in a sub frame 5, an almanac (predicted orbit information) is transmitted.

Here, a date and time counted in the GPS satellite (GPS date and time) do not include a deviation due to execution of a leap second. Thus, since there is a gap between the GPS date and time and a UTC date and time, a date and time calculated by reception of a radio wave from the GPS satellite need to be output after being converted into the UTC date and time. Also, in a case of controlling reception timing of a radio wave from the GPS satellite or estimating a received date and time based on a date and time counted by the counter circuit 46, it is necessary to convert the date and time of the counter circuit 46 into the GPS date and time before utilization.

Next, an operation of acquiring date-and-time information in the electronic clock 1 of the present embodiment will be described.

With respect to TOW-Count, a sub frame ID, and WN in the sub frame 1 which are transmitted from the positioning satellite, a code array or reception timing can be assumed based on a format of a navigation message (signal transmission format and type of satellite) and a current date and time. In the electronic clock 1 of the present embodiment, a collation code string including such a code that can be assumed (assumption code) is previously generated, and a position of the collation code string is deviated, within a deviation range corresponding to an error of the counter circuit 46, with respect to reception timing based on a date and time of a received code which are counted by the counter circuit 46 (assumed reception timing). Then, comparison and collation with an assumption code in the collation code string are serially performed. Then, information related to an accurate date and time (date-and-time information) corresponding to a deviation amount, in which a plurality of reception codes and assumption codes are matching, and contents of the collation code string (assumption code) is calculated.

In the assumption code, a certain code such as a preamble or a reserved bit may be included regardless of a transmission cycle in addition to a code that varies according to a date and time in a manner described above. Also, it is not impossible to predict a code such as an Alert flag or an Anti-spoof flag which code is usually "0" and is not preferably used in a case of "1". However, the code may be added to an assumption code on the assumption that the code is "0."

Moreover, a code array received in the latest one or plurality of times of reception of a satellite radio wave and a reception date and time thereof are stored in the storage unit 63. In the stored code array, a code, a change of which from previous reception cannot be fully predicted according to a code position in a navigation message but which can be determined that there is no change in an elapsed time from the previous reception in a case where the elapsed time is short, such as each code included in a telemetry message of WORD1 may be used as an assumption code. Alternatively, an assumption code may be a combination of a part or a whole of a telemetry message and the above-described fixed code string or the code string that varies according to a transmission cycle. Determination whether to include a code in an assumption code is not necessarily made based only on elapsed time from the previous reception. For example, a condition whether there is no change in a plurality of times of reception may be added.

Similarly, in a case where data, which is related to an orbit of a positioning satellite, such as almanac data is acquired and a period until a next update is not elapsed yet, the data related to an orbit can be also included in an assumption code.

Parity data arrayed in 25 to 30th bits of each word is calculated based on a parity code of 29th bit or 30th bit in a previous word and necessary bit data in first to 24th bits in the same word. In the electronic clock 1 of the present embodiment, it is difficult to assume parity codes of the 29th bit and the 30th bit in the previous word. Thus, these pieces of parity data are not included in the assumption code.

All assumption codes are not necessarily continuous in a collation code string and may be divided into a plurality of different code strings. For example, the assumption code may be determined by reserved bits that are 23rd and 24th bits of WORD1, and TOW-Count that is first to 17th bits of WORD2 with parity bits from 25th to 30th bits of WORD1 therebetween. Here, by setting an assumption propriety flag (identification information) corresponding to each code, it is possible to identify an assumption code and a code that cannot be assumed in a collation code string. An array of this assumption propriety flag is generated along with generation of a collation code string.

Here, in collation of each assumption code of a collation code string and a reception code, in a code string corresponding to information that is actually transmitted from a GPS satellite, codes of first to 24th bits may be inverted (in predetermined condition) according to parity data that is a code (inversion code) at the end (30th bit) of a previous word in each word (code block). That is, while codes of first to 24th bits of a next word are transmitted without inversion according to transmission information in a case where an inversion code is "0," all code strings corresponding to transmission information are inverted in codes of first to 24th bits of a next word in a case where this inversion code is "1." Thus, when an assumption code in which inversion is not considered and each reception code that is not inverted are compared and collated accurately, a collation result becomes a complete correspondence. Also, when an assumption code in which inversion is not considered and each inverted reception code are compared and collated accurately, a collation result becomes a complete noncorrespondence.

At reception timing of a reception code, a shift of a phase (number of code) is generated for a gap between timing assumed based on a date and time counted by the counter circuit 46 and the date and time counted by the counter circuit 46. As described above, since a rate of the counter circuit 46 is 0.5 second/day (1/48 [sec/h]), a maximum deviation value dt (half of maximum deviation) from an accurate date and time of those calculated by the counter circuit 46 is estimated to be dt=tp/48 according to elapsed time tp [h] from the latest correction of a date and time. That is, it is estimated that an accurate date and time tc is in a range of t−dt≤tc≤t+dt with respect to a date and time t counted by the counter circuit 46.

In the electronic clock 1 of the present embodiment, each assumption code that is assumed to be in the range of t−dt≤tc≤t+dt is collated with a reception code r(t) acquired at the date and time t counted by the counter circuit 46 (assumed reception timing) without consideration for the above inversion. Then, collation results calculated with respect to a plurality of dates and time t are respectively integrated with elements in an array corresponding to a relative position in an assumed range of the accurate date and time tc, whereby the most matching (correspondent/noncorrespondent) timing is specified.

FIG. 3A to FIG. 4C are views for describing collation of a code in the electronic clock 1 of the present embodiment.

Figure 3A:
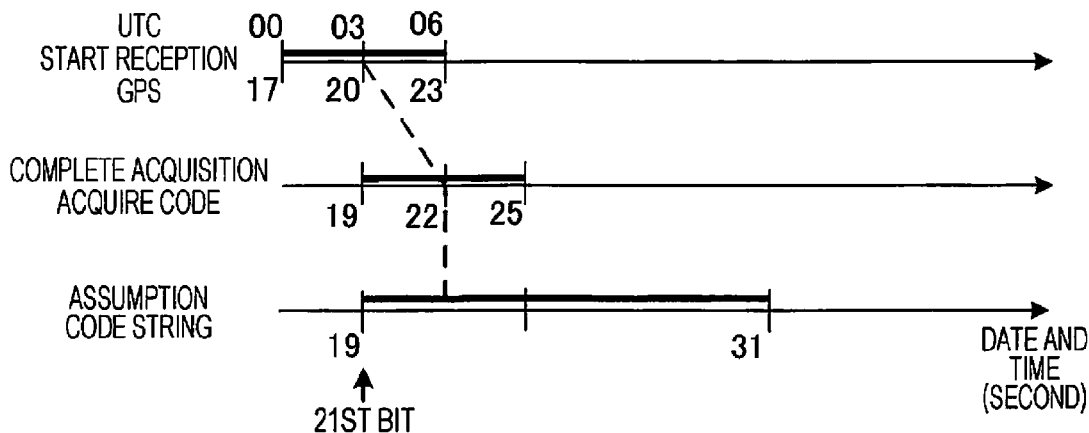
FIG. 3A is a view for describing collation of a code.

As illustrated in FIG. 3A, after 6 days (144 hours) from previous date-and-time correction of the counter circuit 46, when reception is started at 03 seconds at certain time in UTC time in a date and time counted by the counter circuit 46, it is estimated that a second value of the accurate date and time tc is between 00 second to 06 seconds (maximum deviation value dt=3.0 sec). A second value of this date and time is between 17 seconds and 23 seconds in the GPS date and time in a case where a difference between the UTC date and time and the GPS date and time is 17 seconds. Moreover, in a case where two seconds are necessary from acquisition of a radio wave from the GPS satellite until acquisition of a code is started, acquisition of a code is started between 19 seconds to 25 seconds in a second value of the GPS date and time. In this case, a generated collation code string includes 19 seconds to 25 seconds in second values of the GPS date and time and can further include second values up to 31 seconds that are in six seconds corresponding to one sub frame (transmission cycle) from the latest 25 seconds. Also, since a code before 19 seconds is not necessary after generation of the collation code string, it is possible to store and hold only a collation code string with a code at 19 seconds as a head. Here, since a word including a code at a head which code is started from 19.00 seconds is started from 18.60 seconds, this code at the head is in the 21st bit of the word. A position of the word at the head in the word is stored as an offset value q.

Figure 3B:
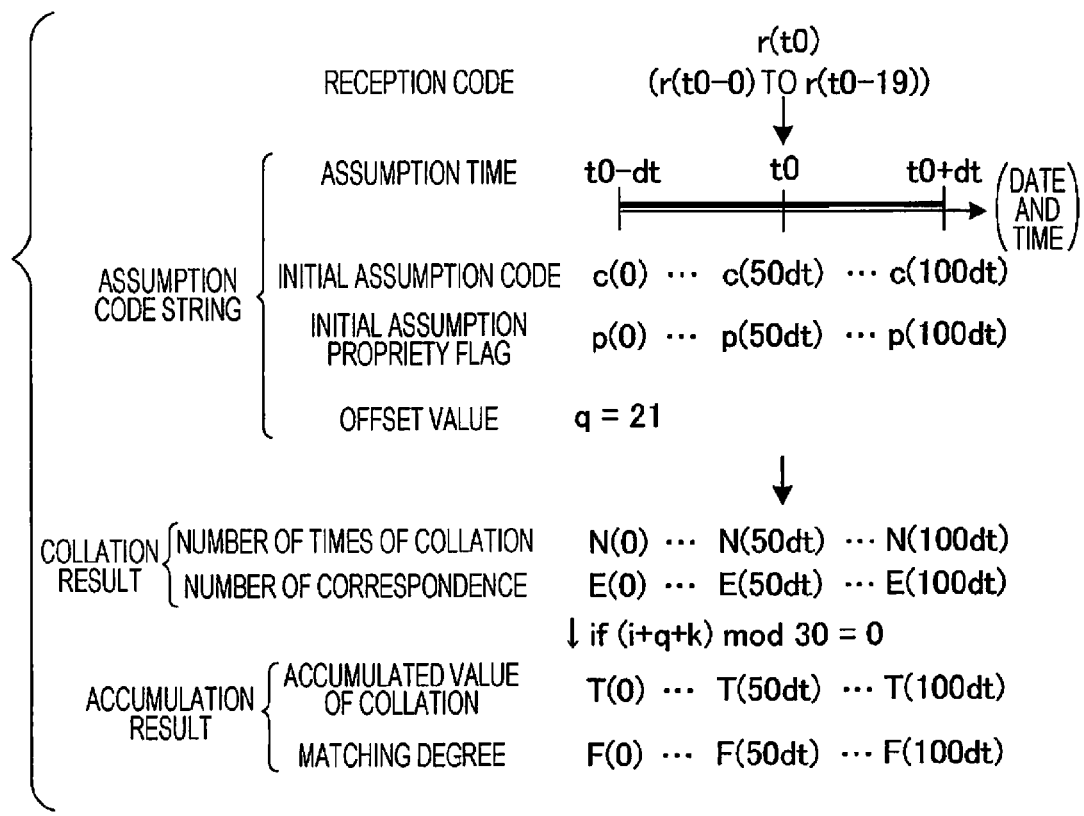
FIG. 3B is a view for describing collation of a code.

As illustrated in FIG. 3B, when a reception code r(t0) in a date and time t0 (here, second value is 22 second) counted by the counter circuit 46 is acquired first, 301 assumption propriety flags p(i) from an assumption propriety flag p(0) corresponding to a date and time t0−dt (here, 19 second) in a collation code string to an assumption propriety flag p(100 dt) corresponding to a date and time t0+dt (here, 25 second) are referred to and a code c(i) indicating that assumption of the code c(i) in a collation code string c is "possible," that is, the code is an assumption code (for example, p(i)=1) and a reception code r(t0) are compared with each other. This array number i indicates a relative position (value corresponding to deviation amount) in an assumed range (that is, deviation range) of an accurate date and time.

When the assumption propriety flag p(i) indicates that the code c(i) can be assumed and collation is performed, 1 is added to the number of times of collation N(i). Here, as described above, p(i) may be added to the number of times of collation N(i) with p(i)=1 in a case where assumption is possible and with p(i)=0 in a case where assumption is not possible. Also, as a result of the collation, a correspondent one is held after 1 is added to the number of correspondences E(i) as information related to a collation result indicating a correspondence or noncorrespondence.

The above processing operation is repeated each time a newly-received code is identified. As described above, since codes of 50 bits are transmitted from the GPS satellite in each second, this processing operation is repeated in intervals of ϵ=20 [msec]. The case where one reception code is identified in each 20 msec is not the limitation. Alternatively, for example, a code type may be identified in each 1 msec and code types rs(t0−0) to rs(t0−19) may be acquired for 20 times in a reception period of one code. Even in this case, one code c(i) in the collation code string c is compared with the 20 code types. For example, in a case where received signal strength indicator is decreased, identification results may vary among these 20 code types. In this case, a probability that the 20 code types become identical is higher than ½ and depends, for example, on a bit error rate (BER).

As described above, in a signal from a positioning satellite, transmission is performed with inversion/noninversion of a code being determined in a word unit (each 30 bit). Thus, in a demodulated code string, a correspondence/noncorrespondence with each assumption code in the collation code string c varies in the word unit. That is, when the number of correspondences E(i) between an assumption code and reception codes is simply integrated among a plurality of words, the number of correspondent parts and the number of noncorrespondent parts of a code are mixed each time the code is inverted and it is not possible to appropriately calculate a matching phase.

Thus, in the electronic clock 1, the number of times of collation and the number of correspondences between the assumption code and the reception codes are counted in a word unit (in each code block) in the collation code string c, larger one of the number of correspondences and the number of noncorrespondences is determined as the number of times of matching (matching determination), and conversion into a matching degree F(i) (integrated value of matching) that is a value corresponding to a value of the larger one is performed. Then, by integration of the matching degrees F(i) with respect to a plurality of words, a matching degree with respect to each deviation amount (phase) is calculated and a deviation amount of a collation code string c (matching deviation amount) which amount is most likely to be a matching deviation amount (which amount satisfy predetermined matching condition) is determined. Here, the matching degree F(i) is calculated by the following expression (1).

$$F(i) = |N(i) - 2 \times E(i)| \quad (1)$$

That is, the matching degree F(i) becomes identical to the number of times of collation N(i) and has the maximum value when codes the number of which is equal to the number of times of collation N(i) are completely correspondent (E(i)=N(i)) or completely noncorrespondent (E(i)=0). Also, the matching degree F(i) has the minimum value "0" when each of the number of correspondences and the number of noncorrespondences is a half (E(i)=N(i)/2). The matching degree F(i) is not necessarily according to this expression (1) as long as the matching degree F(i) is a value that treats a correspondence and a noncorrespondence equally in a similar manner.

While the number of correspondences E(i) of each code in a word unit is converted into the matching degree F(i) and added, the number of times of collation N(i) is added to the accumulated value of collation T(i) (integrated value of collation). Each of the number of correspondences E(i) and the number of times of collation N(i) is initialized into "0" and used in collation of a next word unit.

That is, arrays of each of the number of correspondences E(i), the number of times of collation N(i), the matching degree F(i), and the accumulated value of collation T(i) are assigned to the memory 62 of this electronic clock 1 for the number corresponds to the maximum deviation range assumed in the electronic clock 1. For example, as described above, the maximum deviation range can be set to ±3 seconds and the number of arrays in this case is 301 each.

As illustrated in 4A, a reception code r(t0+ϵk) in elapsed time ϵk from an initially-identified reception code r(t0) is a (k+1)th reception code and an assumed range of an accurate date and time is (t0+ϵk−dt)≤tc≤(t0+ϵk+dt). Then, an assumption code in codes c(k) to c(100 dt+k) in a collation code string corresponding to this range is compared and collated with the reception code r(t0+ϵk) based on the assumption propriety flags p(k) to p(100 dt+k). Whether the collation between these codes c(k) to c(100 dt+k) and the reception code r(t0+ϵk) are performed and a collation result are integrated with the number of times of collation N(0) to N(100 dt) and the number of correspondences E(0) to E(100 dt). Also, the number of times of collation N and the number of correspondences E corresponding to a code, which is an end of a word, among the codes c(k) to c(100 dt+k) are respectively integrated with the accumulated value of collation T and a matching degree F, and are converted and initialized.

An end of a word can be determined based on the above-described offset value q. That is, a position of an array number i in which the sum of the array number i, the number of counts k related to the number of times of identification of a code, and the offset value q satisfies a relationship in the following expression (2) with respect to an integer value j is an end of each word.

$$i+q+k=30\times j \qquad (2)$$

In such a manner, the number of times of collation N(i) and the number of correspondences E(i) are integrated with the accumulated value of collation T(i) and the matching degree F(i) by 30 each time a reception code is identified and collated. Thus, a position where this integration is performed is deviated by one.

Figures 4A, 4B, 4C:
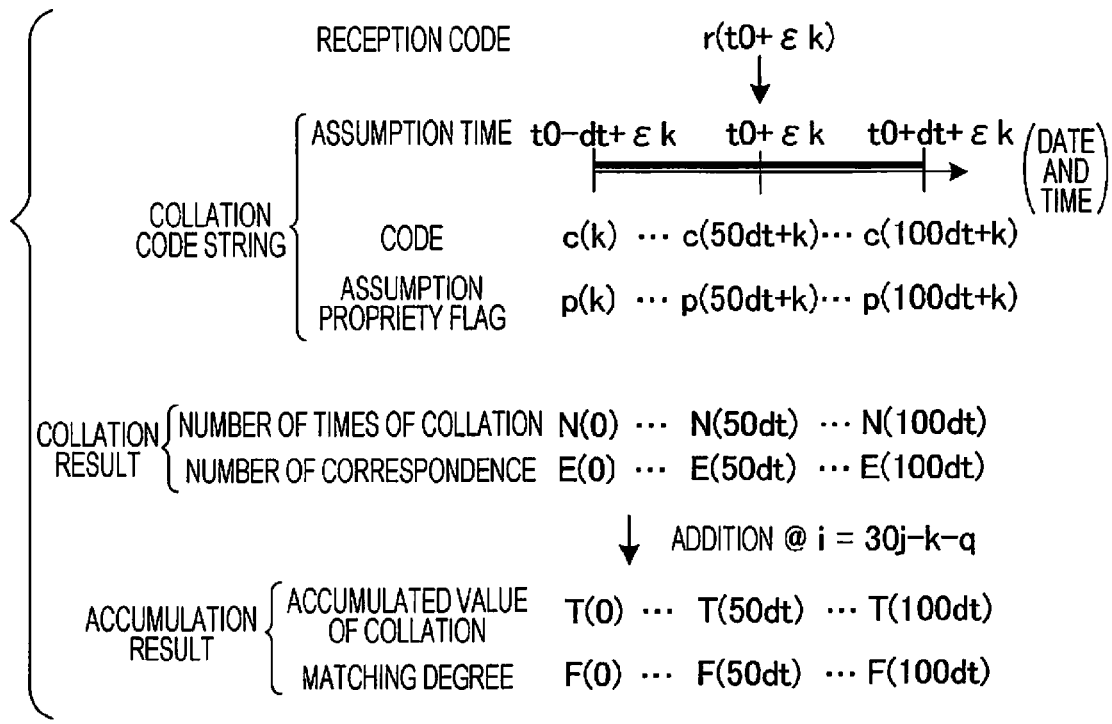
FIG. 4A is a view for describing collation of a code.
FIG. 4B is a view for describing collation of a code.
FIG. 4C is a view for describing collation of a code.

As illustrated in FIG. 4B, for example, in a case of identifying one reception code in each 20 msec in synchronization with each code, there are 22 assumption codes with respect to a first word in an array number i=10. When 10 of them are correspondent, N(10)=22 and E(10)=10 are counted. These are converted, integrated, and passed to F(10)=2 and T(10)=22 and E(10) and N(10) are initialized when collation of all assumption codes with respect to the word is over.

Then, when E(10)=9 and N(10)=16 are further counted with respect to 16 assumption codes for a next word, this value of N(10) is added to T(10) and T(10)=38 is calculated. Also, 2 that is a matching degree converted from E(10) is added to F(10) and F(10)=4 is calculated. In such a manner, in a case where the number of correspondences E(10) is about a half of the number of times of collation N(10), the matching degree F(10) becomes a small value compared to the accumulated value of collation T(10).

On the other hand, there are 22 assumption codes with respect to one word in an array number i=200. When all of them are correspondent, N(200)=22 and E(200)=22 are counted. Then, after conversion and addition are performed and F(200)=22 and T(200)=22 are calculated, E(200) and N(200) are initialized.

There are 22 assumption codes with respect to a next word. When only one of them is correspondent, N(200)=22 and E(200)=1 are counted. In this case, a matching degree converted from E(200) becomes 20. Thus, this value is added to the matching degree F(200), and F(200)=42 is calculated. Also, N(200)=44 is calculated. In such a manner, the number of correspondences E(200) is equal to the number of times of collation (200) or is close to "0," the matching degree F(200) becomes a value close to the accumulated value of collation T(200).

Similarly, as illustrated in FIG. 4C, in a case where a code type is determined for twenty times in 1 msec with respect to each code, the counted number of times of collation N(10) and N(200) and the accumulated value of collation T(10) and T(200) becomes 20 times larger. The number of correspondences E(10) and E(200) is counted in a similar manner and the matching degrees F(10) and F(200) are also calculated in a similar manner. Thus, here, F(10)=46 is calculated for T(10)=760 and F(200)=876 is calculated for T(200)=880 at a time point at which collation related to the second word is over.

A matching degree F(i1) corresponding to the certain accumulated value of collation T(i1) in the accumulated value of collation T(i) calculated in such a manner becomes a value that is equal to or adequately close to the accumulated value of collation T(i1). A probability that a collation code string c, a phase of which is shifted in accordance with the array number i1, and a reception code are correspondent becomes adequately high compared to a probability (matching probability) that is accidentally generated due to erroneous identification of a code in a different code string or a probability that a collation code string c, a phase of which is shifted in accordance with a different array number i2, and a reception code are correspondent. Thus, timing at which the collation code string c and the reception code becomes correspondent is identified. When a life of the electronic clock 1 such as 10 to 20 years and a frequency of performing this collation operation such as once in a day are considered and it is simplified that each of probabilities of occurrence of "0" and "1" (equal to probability of being matching with reception code) in each binary code is ½, the number of assumption codes (accumulated value of collation and reference number of times of collation) that is necessary to make a probability of erroneous identification adequately low in practical, for example, that is necessary to make a matching probability lower than a predetermined reference value that is, here, 10-8 is 27. Note that this probability can be increased/decreased directly or indirectly by setting operation by a user (for example, different reference value may be set in manner associated with expression such as "strictly," "normal," or "loosely").

Figure 5:
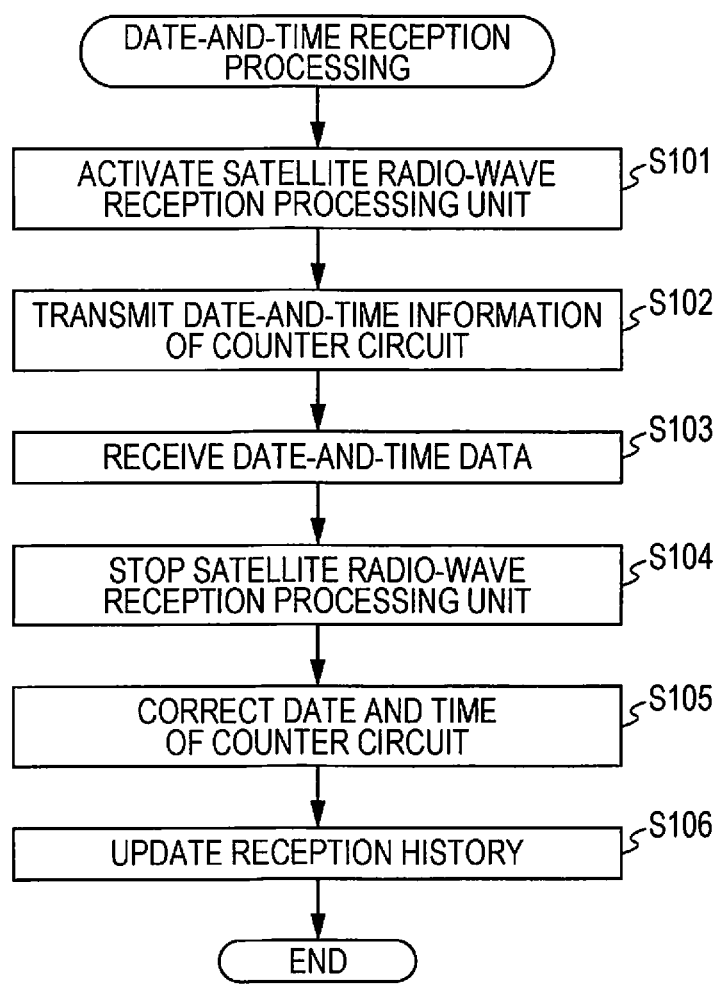
FIG. 5 is a flowchart of date-and-time reception processing.

FIG. 5 is a flowchart illustrating a control procedure of date-and-time reception processing by the host CPU 41 in the electronic clock 1 of the present embodiment.

This date-and-time reception processing is started in a case where input operation of an execution command from a user into the operation unit 49 is detected or a condition such as predetermined reception time, reception timing, or the like is satisfied.

When the date-and-time reception processing is started, the host CPU 41 activates the satellite radio-wave reception processing unit 60 (step S101). Also, the host CPU 41 transmits, as initial data, setting indicating that date-and-time information is an object of reception and information of a date and time counted by the counter circuit 46 to the satellite radio-wave reception processing unit 60 (step S102). This date-and-time information includes information of a maximum value of a deviation based on elapsed time from previous correction of a date and time in the counter circuit 46. Then, a data output from the satellite radio-wave reception processing unit 60 is waited for. Note that in this waiting, the host CPU 41 may causes the display 47 to perform a display indicating that reception is being performed.

The host CPU 41 waits for a signal from the satellite radio-wave reception processing unit 60 and receives date-and-time data (step S103). Then, the host CPU 41 stops the satellite radio-wave reception processing unit 60 (step S104) and corrects the date and time counted by the counter circuit 46 (step S105). Also, the host CPU 41 updates a reception history stored in the RAM 43 (step S106). Then, the host CPU 41 ends the date-and-time reception processing.

Figure 6:
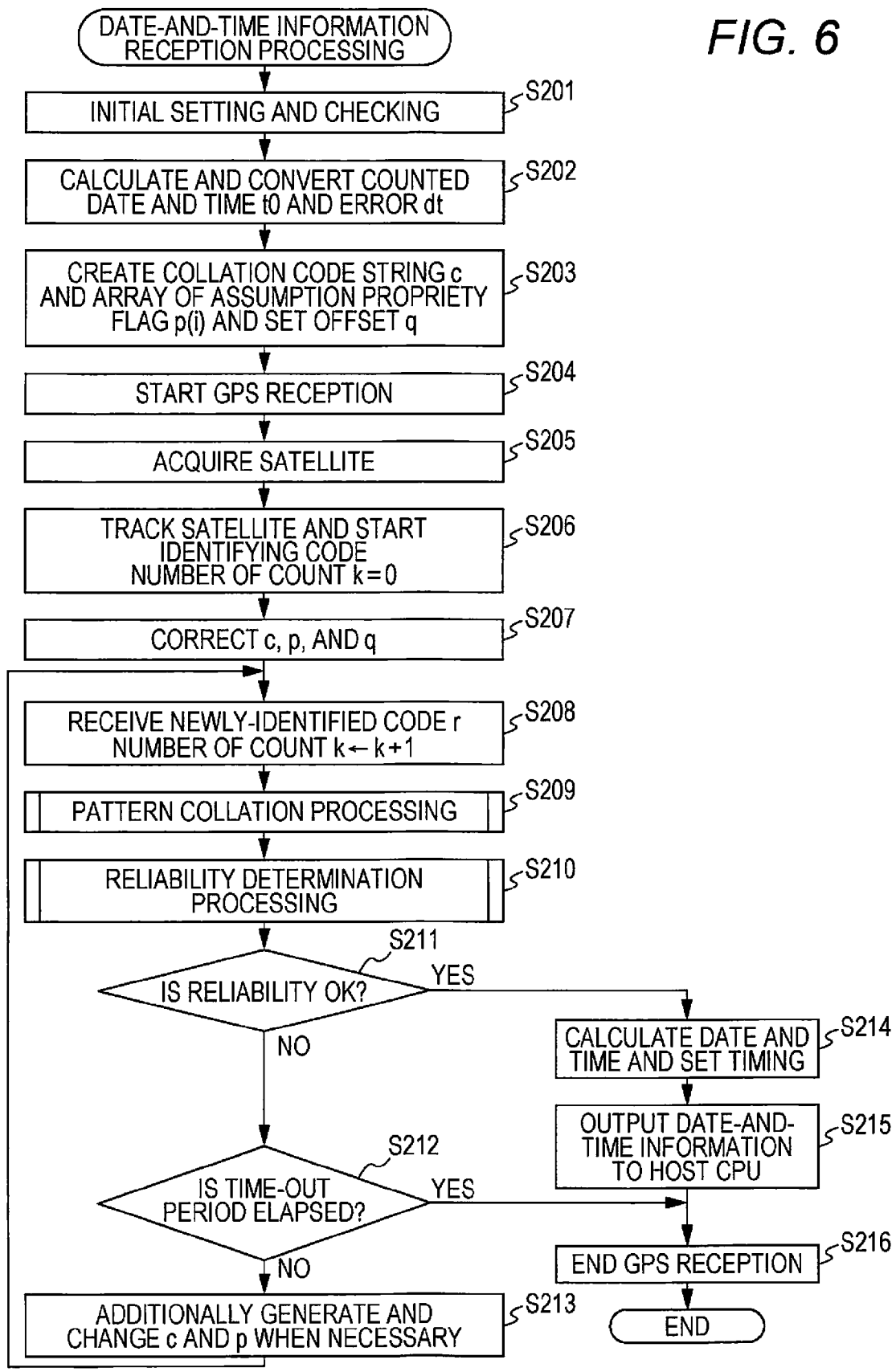
FIG. 6 is a flowchart of date-and-time information reception processing.

FIG. 6 is a flowchart illustrating a control procedure of date-and-time information reception processing by the module CPU 61 in the electronic clock 1 of the present embodiment.

This date-and-time information reception processing is started in a case where the satellite radio-wave reception processing unit 60 is activated by the host CPU 41 and information to be received which information is output from the host CPU 41 in the processing of step S102 is date-and-time information.

When the date-and-time information reception processing is started, the module CPU 61 performs an initial setting such as securing or assigning of a memory area or an operation check (step S201). The module CPU 61 calculates the date-and-time information output from the host CPU 41 in the processing of step S102, converts an calculated UTC date and time into a GPS date and time, and estimates a range of an accurate date and time based on error information (step S202).

The module CPU 61 generates an array of an assumption propriety flag p(i) and a collation code string c in a range including all codes assumed to be received in the estimated range of an accurate date and time, and determines an offset value q of the collation code string c (step S203; collation code string generation step). Also, here, the module CPU 61 performs a memory assignment operation and an initialization operation of the number of times of collation N(i), the accumulated value of collation T(i), the number of correspondences E(i), and the matching degree F(i). The module CPU 61 starts receiving a radio wave from the GPS satellite (step S204) and acquires a radio wave from a GPS satellite reception from which is possible (step S205). The module CPU 61 applies a signal acquired from a received radio wave to a C/A code of each GPS satellite while shifting a phase of the signal and tries an inverse spread spectrum, whereby a signal from any one or more GPS satellites, the number of which is equal to or smaller than a predetermined number, is detected and acquired.

When a signal from the GPS satellite is acquired, the module CPU 61 starts identifying each code of reception data while tracking the GPS satellite in the acquired phase (step S206). Also, the module CPU 61 sets an initial value "0" as the number of counts k. Based on a gap between timing at which the collation code string c and the assumption propriety flag p(i) are generated in the processing of step S203 and timing at which identification of the code is actually started, the module CPU 61 corrects the collation code string c, the array of the assumption propriety flag p(i), and the offset value q (step S207).

Each time one code is identified, the module CPU 61 receives the code and adds 1 to the number of counts k (step S208; code identification step). The module CPU 61 invokes and executes pattern collation processing (step S209) and subsequently invokes and executes reliability determination processing as a deviation amount identification step (step S210). The module CPU 61 determines whether reliability is OK according to a determination result calculated in the processing of step S210 (step S211). When it is determined that reliability is not OK ("NO" in step S211), the module CPU 61 determines whether a time-out period is elapsed after reception of a radio wave from the GPS satellite is started (step S212). When it is determined that the period is elapsed ("YES" in step S212), the processing by the module CPU 61 transitions to step S216. When it is determined that the period is not elapsed ("NO" in step S212), the module CPU 61 additionally generates a code c(i) in the collation code string c and an assumption propriety flag p(i) when necessary (step S213). Here, an expression "when necessary" indicates a case where it is assumed that determination of reliability being OK is not acquired in data in an initially-generated code string length such as 12 seconds from 19 to 31 seconds in second values, or a case where determination of reliability being OK is not acquired in the data.

Here, a code data part of an unnecessary collation code string c and a corresponding assumption propriety flag p(i) can be deleted. Also, in order not to make the array number unnecessarily large, array numbers i of remaining and added codes c(i) and assumption propriety flags p(i) corresponding to these may be aligned to the front according to the number of deleted codes. In this case, each of the offset value q and the number of counts k is also corrected. Then, the processing by the module CPU 61 goes back to step S208.

In a case where it is determined in the determination processing in step S211 that reliability is OK ("YES" in step S211), the module CPU 61 calculates an accurate GPS date and time based on timing of a code array, the reliability of which is determined to be OK, and a date and time indicated by the collation code string, converts the calculated GPS date and time into a UTC date and time, and sets the timing (step S214). The module CPU 61 outputs the date-and-time information to the host CPU 41 at the set timing (step S215). Then, the processing by the module CPU 61 transitions to step S216.

When a transition to the processing of step S216 is performed, the module CPU 61 ends reception of a radio wave from the GPS satellite (step S216). Then, the module CPU 61 ends the date-and-time information reception processing.

Figure 7:
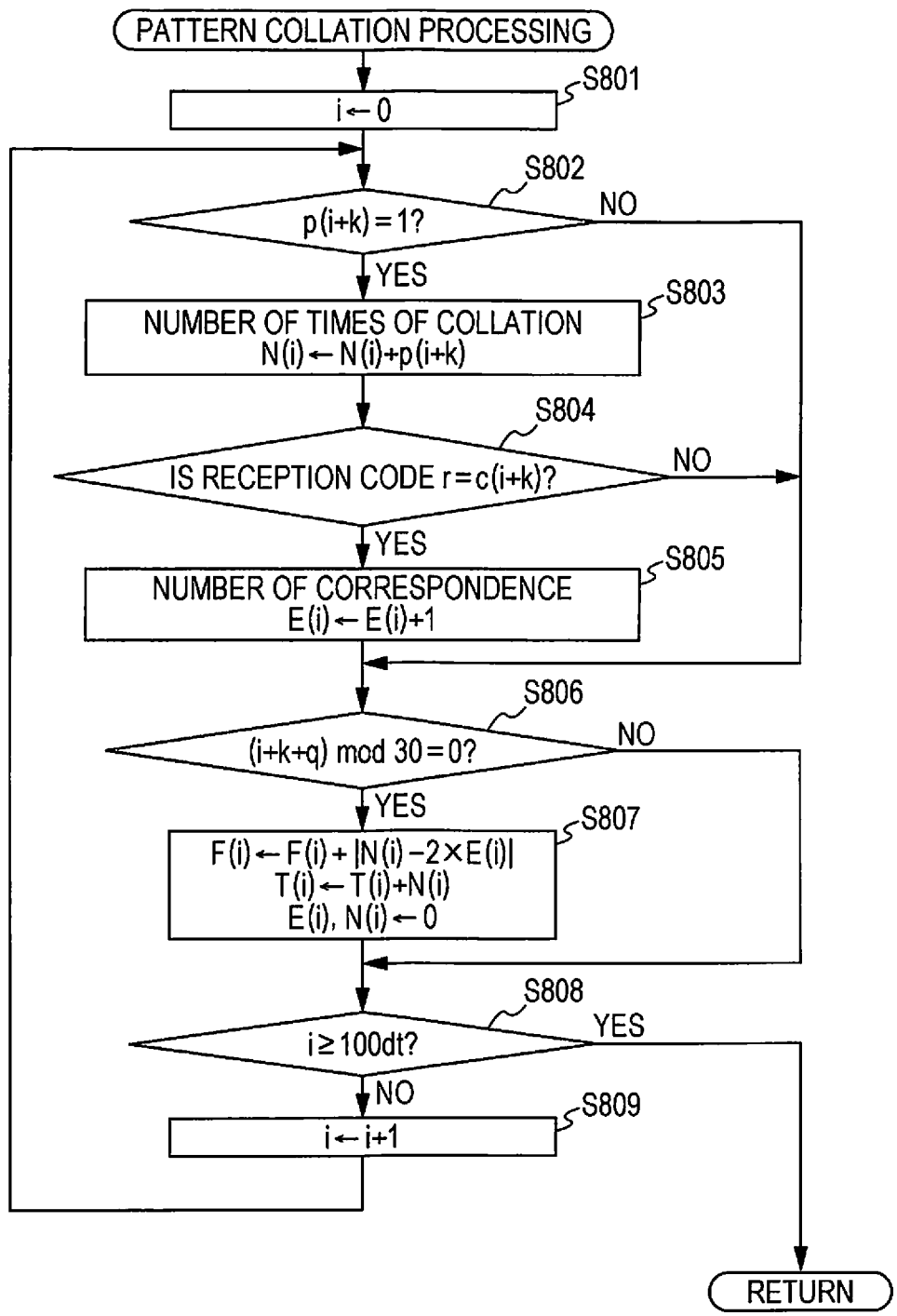
FIG. 7 is a flowchart of pattern collation processing invoked in the date-and-time information reception processing.

FIG. 7 is a flowchart illustrating a control procedure of pattern collation processing invoked in step S209 of the date-and-time information reception processing.

When the pattern collation processing is invoked, the module CPU 61 sets the array number i to "0" that is an initial value (step S801).

The module CPU 61 refers to an assumption propriety flag p(i+k) and determines whether a code c(i+k) is a code that can be assumed (step S802). When it is determined that the assumption is not possible ("NO" in step S802), the processing by the module CPU 61 transitions to step S806.

When it is determined that the code c(i) is an assumption code ("YES" in step S802), the module CPU 61 adds an assumption propriety flag p(i+k), that is, "1" to the number of times of collation N(i) (step S803) and determines whether a reception code r and the code c(i+k) are equal (step S804; collation step). When it is determined that codes are not equal ("NO" in step S804), the processing by the module CPU 61 transitions to step S806.

In a case where the reception code r and the code c(i+k) are equal ("YES" in step S804), the module CPU 61 adds "1" to the number of correspondences E(i) (step S805). Then, the processing by the module CPU 61 transitions to step S806.

The processing of step S802 and step S805 configures a result holding step.

When a transition to the processing of step S806 is performed, the module CPU 61 determines whether a remainder (mod) of when a total value of the array number i, the number of counts k, and the offset value q is divided by 30 is "0," that is, whether a value of i+k+q is a multiple of 30 (step S806). This determination processing is performed, for example, by determination whether a remainder of when i+k+q is divided by 30 is "0." When it is determined that the value is a multiple of 30 ("YES" in step S806), the module CPU 61 converts the number of correspondences E(i) into a matching degree F (perform matching determination) and adds the matching degree F to a currently-set matching degree F(i). Also, the module CPU 61 adds the number of times of collation N(i) to the accumulated value of collation T(i) (step S807; matching determination step). Then, the processing by the module CPU 61 transitions to step S808. When it is determined that the value is not a multiple of 30 ("NO" in step S806), the processing by the module CPU 61 transitions to step S808.

When a transition to the processing of step S808 is performed, the module CPU 61 determines whether the array number i is equal to or larger than 100 dt (step S808). That is, the module CPU 61 determines whether comparison and collation between all assumption codes in an assumed range from a code c(k) to a code c(100 dt+k) and a reception code r are performed. When it is determined that the array number i is not equal to or larger than 100 dt, that is, there is an assumption code that is not yet compared or collated in the assumed range ("NO" in step S808), the module CPU 61 adds "1" to the array number i (step S809). That is, the module CPU 61 brings the processing back to step S802. When it is determined that the array number i is equal to or larger than 100 dt, that is, comparison and collation between all assumption codes in the assumed range and the reception code r are performed ("YES" in step S808), the module CPU 61 ends the pattern collation processing and brings the processing back to the date-and-time information reception processing.

Figure 8:
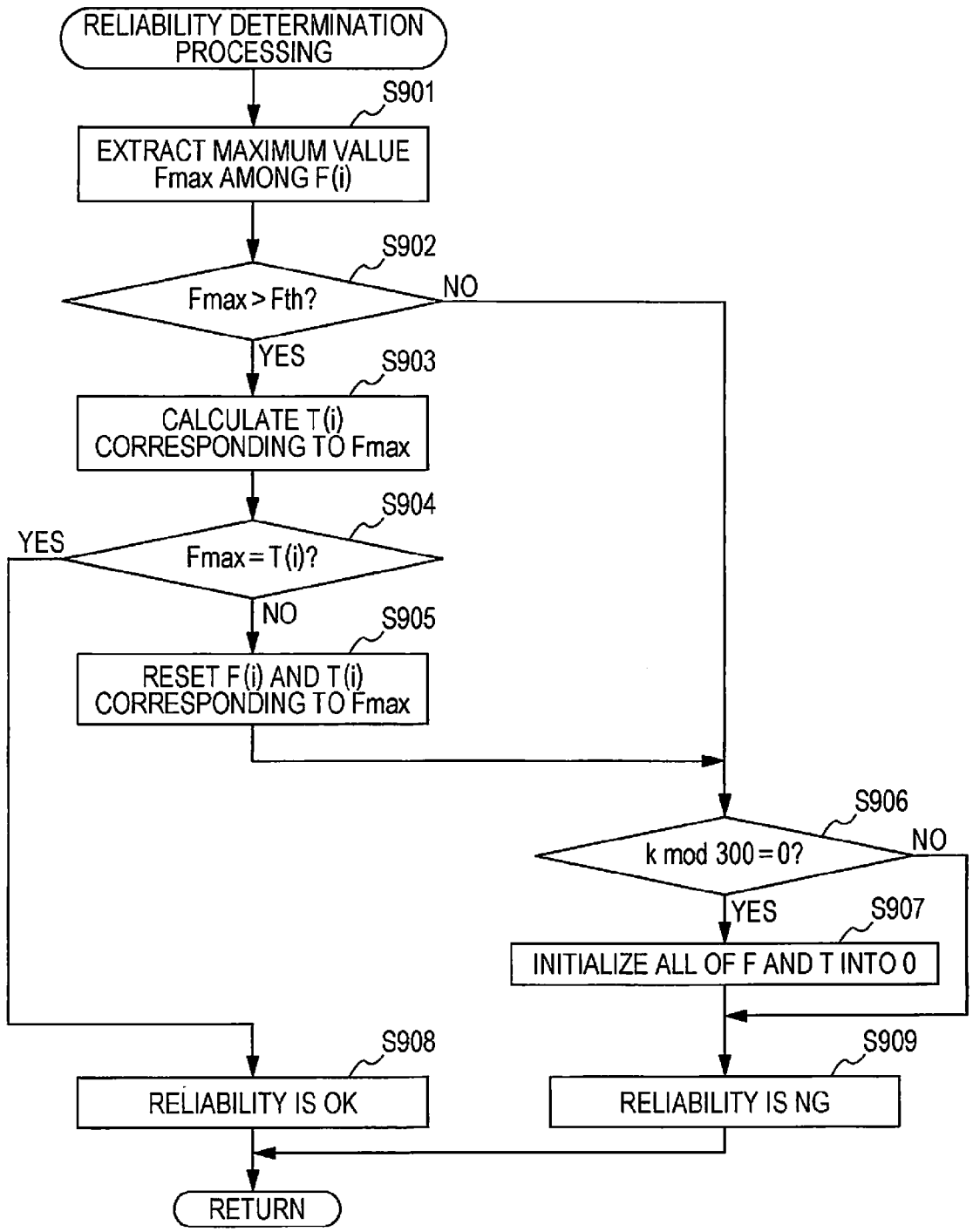
FIG. 8 is a flowchart of reliability determination processing invoked in the date-and-time information reception processing.

FIG. 8 is a flowchart illustrating a control procedure of the reliability determination processing invoked in step S210 of the date-and-time information reception processing.

When the reliability determination processing is invoked, the module CPU 61 extracts maximum one in the matching degree F(i) as a maximum matching degree Fmax (step S901). The module CPU 61 determines whether the maximum matching degree Fmax is larger than a reference matching degree Fth (step S902). When it is determined that the maximum matching degree Fmax is not larger than the reference matching degree Fth ("NO" in step S902), the processing by the module CPU 61 transitions to step S906.

When it is determined that the maximum matching degree Fmax is larger than the reference matching degree Fth ("YES" in step S902), the module CPU 61 calculates the accumulated value of collation T(i) corresponding to an array number i of the matching degree F(i) with which the maximum matching degree Fmax is calculated (step S903). The module CPU 61 determines whether the maximum matching degree Fmax and the calculated accumulated value of collation T(i) are equal (step S904). When it is determined that the two are equal ("YES" in step S904), the module CPU 61 determines that the reliability is OK (step S908), ends the reliability determination processing, and brings the processing back to the date-and-time information reception processing.

When the it is determined that the maximum matching degree Fmax and the accumulated value of collation T(i) are not equal ("NO" in step S904), the module CPU 61 resets the matching degree F(i), with which the maximum matching degree Fmax is calculated, and the accumulated value of collation T(i) corresponding to this back to "0" and makes the processing transition to step S906.

When the processing of step S902 or step S905 transitions to the processing of step S906, the module CPU 61 determines whether a remainder of when the number of counts k is divided by 300 (that is, number of code in one sub frame) is "0" (step S906). When it is determined that the remainder is "0" ("YES" in step S906), the module CPU 61 initializes the accumulated value of collation T(i) and the matching degree F(i) corresponding to each array number i back to "0" (step S907). Then, the module CPU 61 determines that the reliability is NG (step S909). Then, the module CPU 61 ends the reliability determination processing and brings the processing back to the date-and-time information reception processing. When it is determined that the remainder is not "0" ("NO" in step S906), the processing by the module CPU 61 transitions to step S909.

Note that as described above, the matching degree F(i) is identified only in a word unit. Thus, in order to perform determination in more real time, a transitional matching degree $Ft(i)=F(i)+|N(i)-2 \times E(i)|$ may be calculated each time by overwriting and updating and it may be determined whether maximum one in the transitional matching degree Ft(i) is equal to or larger than the reference matching degree Fth and is equal to T(i)+N(i). However, in this case, it is preferable that an additional value $|N(i)-2 \times E(i)|$ is not calculated in a case where N(i)=1.

First Modification Example

Next, a first modification example of date-and-time information reception processing executed in an electronic clock 1 will be described.

In the date-and-time information reception processing of the present modification example, not only in a case of complete matching but also in a case of incomplete matching including a few errors in collation between a collation code string and a reception code r, it is determined that reliability is OK within a range in which a probability of erroneous identification is controlled adequately. Thus, it is possible to calculate date-and-time information even when received signal strength indicator of a radio wave from a positioning satellite is low and an S/N ratio (SNR) is low.

In this electronic clock 1, a condition of determining that a probability of erroneous identification is controlled to be low in a case of incomplete matching is determined based on a probability of occurrence (first probability of occurrence) related to a minimum value of the number of times of discordance with an assumption code in a collation code string having each deviation amount (phase shift) with respect to an array of a reception code r (that is, maximum value of integrated value of matching compared to accumulated value of collation), and a probability of occurrence (second probability of occurrence) related to the second-smallest number of times of discordance (that is, second-largest integrated value of matching). In a case where each of probabilities of occurrence of "0" and "1" in each code is ½, a probability of occurrence P can be expressed by $P = TCEb/2^T$ according to the accumulated value of collation T and the number of times of discordance $Eb=(T-F)/2$ that is the matching degree F converted back to the number of correspondences E, that is, a value equivalent to the number of noncorrespondences in a probability. For example, a probability of occurrence of a reception code string including 3-bit discordance (41-bit matching) in a reception code collated with assumption codes of 44 bits is $44C3/2^{44}=7.53 \times 10^{-10}$. Also, a probability of occurrence of a reception code string including 1-bit discordance (27-bit matching) in a reception code collated with assumption codes of 28 bits is $28C1/2^{28}=1.04 \times 10^{-7}$.

Here, as described above, a possibility of erroneous identification may be eliminated only with a probability of occurrence related to the minimum number of times of discordance as a reference. However, in a case of incomplete matching, a possibility that a code string similar to a collation code string c happens to emerge in an actual reception code string is also increased. Thus, it is preferable that an additional condition that can eliminate emergence of such a similar code string is set. For example, in a case where almost all codes of TOW-Count are "0" or are "1," when these code strings are used as assumption codes, codes are matching in many of parts in which these codes "0" or "1" are continuous in a case where there is a slight phase shift between the collation code string c and the reception code string. Also, in a case where TOW-Count or the like is a cyclic code string (for example, in case where "0" and "1" are arrayed alternately), many codes are matching in a phase shift of the cycle or a phase shift of the half cycle. Thus, in this case, compared to a state of a normal phase shift, the number of times of discordance becomes small and a probability of erroneous identification is increased depending on a noise (radio wave received signal strength indicator) or the like. Thus, in such a case, it is possible to suspend starting of radio wave reception and to wait until timing of an array of a more preferable assumption code or it is possible not to include such an unfavorable code that can be assumed in an assumption code.

First, in an assumed range of a phase shift of a collation code string c which range is set according to a maximum deviation amount of a date and time estimated based on a rate of a counter circuit 46, an assumption code and a reception code are collated in a length of one cycle of each sub frame (300 bit). Then, a maximum matching degree Fmax that is a maximum matching degree in the phase shift set range and a second-largest matching degree Fmax2 that is the second-largest matching degree are extracted. By utilization of these and the maximum matching accumulated value of collation Tmax and the second-largest matching accumulated value of collation Tmax2 corresponding to these, the minimum number of times of discordance Ebmin= (Tmax−Fmax)/2 and the second-smallest number of times of discordance Ebmin2=(Tmax2−Fmax2)/2 are calculated.

Then, a ratio of a probability of occurrence P1 related to the minimum number of times of discordance Ebmin to a probability of occurrence P2 related to the second-smallest number of times of discordance Ebmin2 (probability ratio) is calculated as a degree of risk Pd. In a case where this degree of risk Pd=P1/P2 is equal to or smaller than a predetermined reference value (reference ratio), it is determined that a probability of erroneous identification is adequately low.

Similarly to the above embodiment, a reference value Pm (reference ratio) compared with the degree of risk Pd is determined appropriately according to a life of a product and a radio wave reception frequency, that is, the assumed number of times of reception in a life of a product and accuracy required to the product. Here, for example, Pm=10−8.

Note that in calculation of the degree of risk Pd, it is not necessary to calculate each of the probabilities of occurrence P1 and P2. Also, when the accumulated value of collation T(i) becomes large and a calculation expression of the degree of risk Pd becomes complicated, and in a case where a load becomes heavy or a calculation period becomes long, the degree of risk Pd may be calculated as an approximation by arbitrary utilization of an approximate expression. As the approximate expression, for example, linear approximation or a Stirling's formula is preferably used.

In the electronic clock 1 of the present embodiment, the above-described reliability determination by complete matching is performed in a case where a reception state is well according to an SNR (signal index value related to received signal strength indicator) at a start of identification of a code (predetermined timing). In a case where a reception state is not well, reliability determination according to avoidance of erroneous identification in consideration of incomplete matching is performed. Also, in a case where reliability does not become OK even when predetermined time (upper-limit collation time) such as six seconds in one sub frame is elapsed in the reliability determination based on complete matching, transition to reliability determination according to avoidance of erroneous identification in consideration of incomplete matching is performed and the reliability determination is performed each time data (10 word, 300 bit (unit number of code)) in one sub frame (predetermined one cycle of navigation message) is received.

In the date-and-time information reception processing of this first modification example, only contents of reliability determination processing invoked in date-and-time information reception processing illustrated in FIG. 6 is different from the date-and-time information reception processing in the above embodiment. Thus, in the following, only contents of the reliability determination processing will be described.

Figure 9:
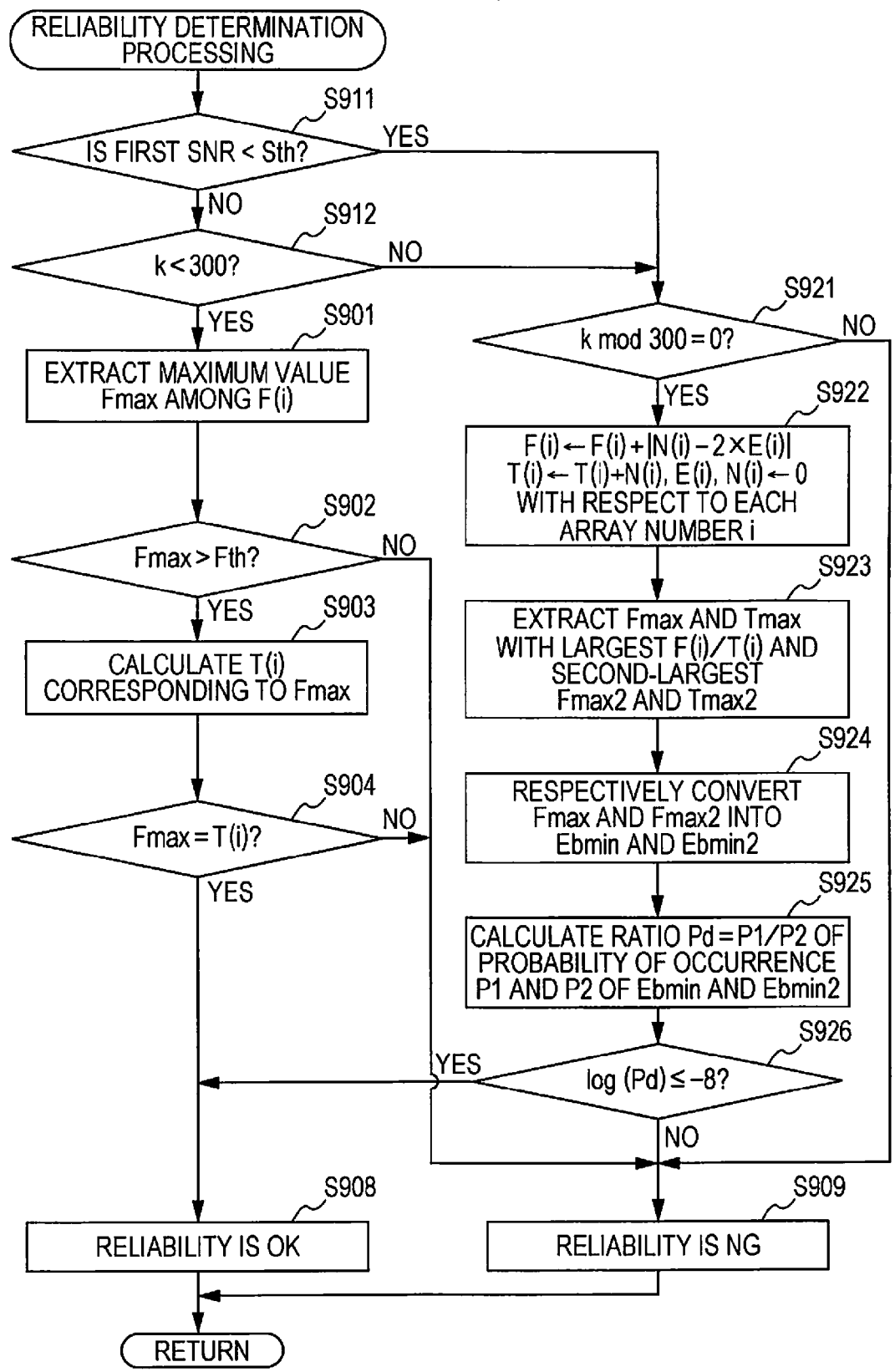
FIG. 9 is a flowchart of reliability determination processing invoked in a first modification example of date-and-time information reception processing.

FIG. 9 is a flowchart illustrating a procedure of control, by a module CPU 61, of the reliability determination processing invoked in the date-and-time information reception processing of the present modification example.

This reliability determination processing is identical to the reliability determination processing in FIG. 8 which processing is invoked in the date-and-time information reception processing of the above embodiment except for a point that the processing of step S905 to step S907 is deleted and processing of step S911, step S912, and step S921 to step S926 is added. The same code is assigned to identical processing contents and a detail description thereof is omitted.

When this reliability determination processing is invoked, the module CPU 61 determines whether an SNR of a received radio wave near timing of first code identification is lower than a predetermined intensity reference value Sth (step S911). When it is determined that the SNR is lower than the intensity reference value ("YES" in step S911), the processing by the module CPU 61 transitions to step S921.

When it is determined that the SNR is not lower than the intensity reference value Sth ("NO" in step S911), it is determined whether the number of counts k is smaller than 300 (step S912). When it is determined that the number is not smaller than 300 ("NO" in step S912), the processing by the module CPU 61 transitions to step S921.

When it is determined that the number of counts k is smaller than 300, the processing by the module CPU 61 transitions to step S901. Then, when it is determined in determination processing of step S904 that a maximum matching degree Fmax is not equal to the corresponding accumulated value of collation T(i) ("NO" in step S904), the processing by the module CPU 61 transitions to step S909.

When processing of step S921 branches from determination processing of step S911 and step S912, the module CPU 61 determines whether a remainder of when the number of counts k divided by 300 is 0 (step S921). When it is determined that the remainder is not 0 ("NO" in step S921), the processing by the module CPU 61 transitions to step S909.

When it is determined that the remainder is 0 ("YES" in step S921), the module CPU 61 respectively include the remaining number of correspondences E(i) and number of times of collation N(i) in the matching degree F(i) and the accumulated value of collation T(i) with respect to each array number i (step S922). The module CPU 61 extracts the maximum matching degree Fmax and the maximum matching accumulated value of collation Tmax with the largest F(i)/T(i), and extracts the second-largest matching degree Fmax2 and the second-largest matching accumulated value of collation Tmax2 with the second-largest F(i)/T(i) (step S923). Note that in a case where the accumulated value of collation T(i) becomes identical with respect to the array number i, the maximum matching degree Fmax and the second-largest matching degree Fmax2 may be simply extracted according to magnitude of the matching degree F(i). The module CPU 61 calculates the minimum number of times of discordance Ebmin and the second-smallest number of times of discordance Ebmin2 by using these extracted values (step S924). The module CPU 61 calculates, as a degree of risk Pd, a ratio of a probability of occurrence P1 of the minimum number of times of discordance Ebmin to a probability of occurrence P2 of the second-smallest number of times of discordance Ebmin2 (step S925).

The module CPU 61 determines whether a common logarithm log (Pd) of the degree of risk Pd is equal to or smaller than −8, that is, whether the degree of risk Pd is equal to or smaller than 10-8 (step S926). When it is determined that the common logarithm log (Pd) is equal to or smaller than −8 ("YES" in step S926), the processing by the module CPU 61 transitions to step S908. When it is determined that the common logarithm log (Pd) is not equal to or smaller than −8 ("NO" in step S926), the processing by the module CPU 61 transitions to step S909.

Second Modification Example

Next, a second modification example of date-and-time information reception processing executed in an electronic clock 1 will be described.

In the date-and-time information reception processing of the present modification example, a phase shift (deviation amount) including many parts of discordance is excluded from a candidate of a phase shift at correspondent timing in the middle and processing thereof is omitted.

In the electronic clock 1 of this second modification example, a memory 62 stores, as parameters, a candidate flag X(i) in addition to the number of correspondences E(i), the number of times of collation N(i), a matching degree F(i), and the accumulated value of collation T(i). Here, this candidate flag X(i) is a binary flag that is set to "0" in a case where an array of a reception code r and a collation code string c with a phase shift (timing deviation) corresponding to an array number i are included in candidates with a correspondent phase (code) and that is set to "1" in a case where these are not included therein. An initial value of the candidate flag X(i) is "0" and is changed to "1" when being removed from a candidate.

As described above, timing corresponding to the maximum matching degree F(i) becomes a candidate of matching with an array of the reception code r. Thus, a matching degree F(i) in which the matching degree F(i) becomes adequately small with respect to the accumulated value of collation T(i) and in which the maximum matching degree Fmax or the second-largest matching degree Fmax2 is not acquired with respect to the number of codes that can be identified in a time-out period or OK cannot be acquired in reliability determination even when the maximum matching degree Fmax or the second-largest matching degree Fmax2 is acquired can be excluded from a candidate. Examples of such a condition (lower-limit standard related to relationship between accumulated value of collation T(i) and matching degree F(i)) include being smaller than a lower-limit reference value of a ratio of the matching degree F(i) to the accumulated value of collation T(i) and being equal to or larger than an upper-limit value of a differential value between the accumulated value of collation T(i) and the matching degree F(i). For example, in a case where F(i)/T(i)<0.2 or T(i)−F(i)≥20 in the accumulated value of collation T(i) equal to or larger than a predetermined reference number Tth, the candidate flag X(i) is changed to "1" and collation and updating of a parameter thereafter are canceled.

Note that when a condition for removal from a candidate becomes loose (condition for leaving in candidate become strict), a second-largest matching degree Fmax2 is likely to become inaccurate while a processing load is decreased. Thus, accuracy of calculating a degree of risk Pd is decreased. However, in a case where all parameters other than a parameter related to one array number i are removed from candidates, reliability determination according to the degree of risk Pd may not be performed and timing of a phase shift related to the one array number i may be identified as matching timing.

Figure 10:
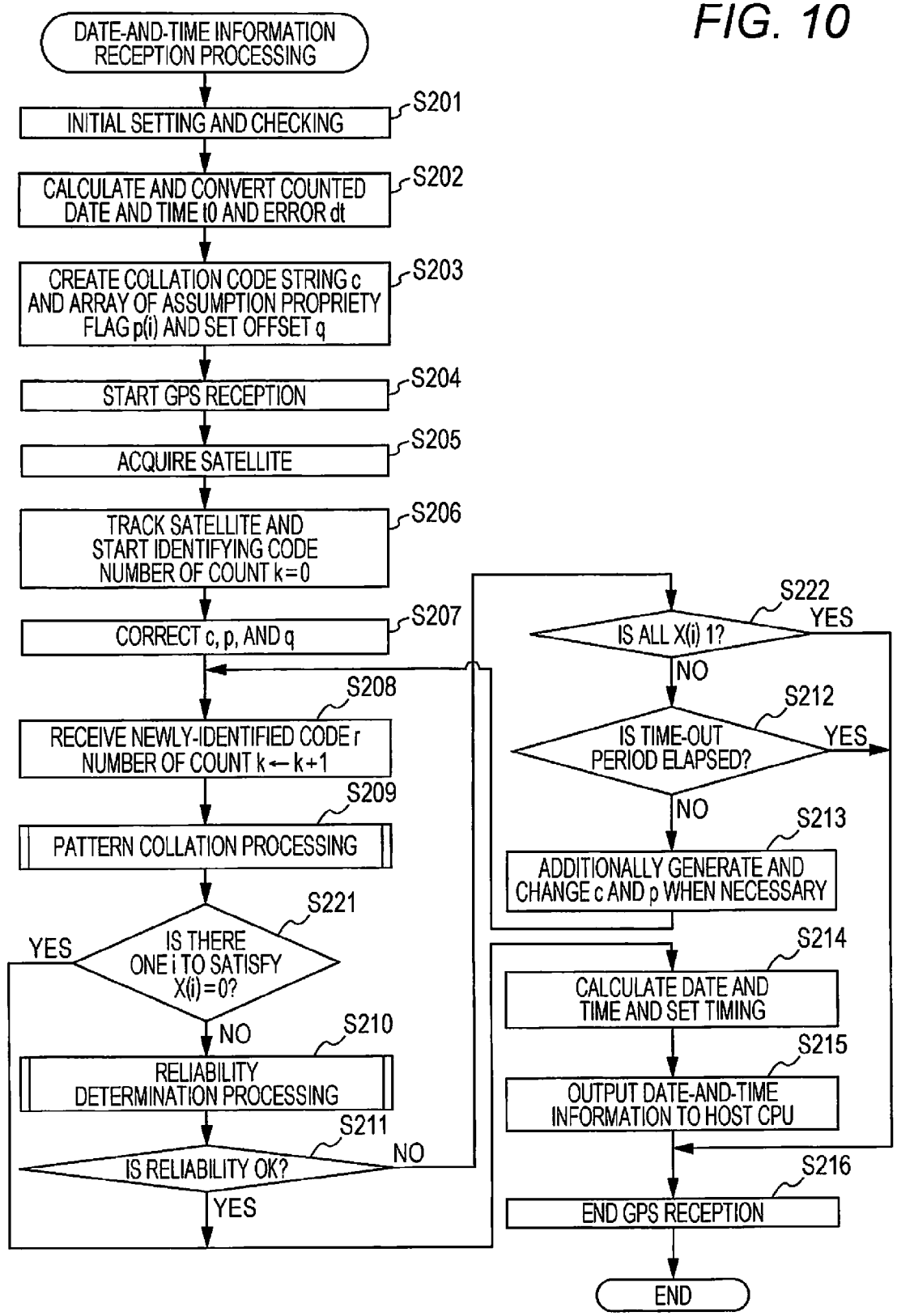
FIG. 10 is a flowchart illustrating a second modification example of date-and-time information reception processing.
Figure 11:
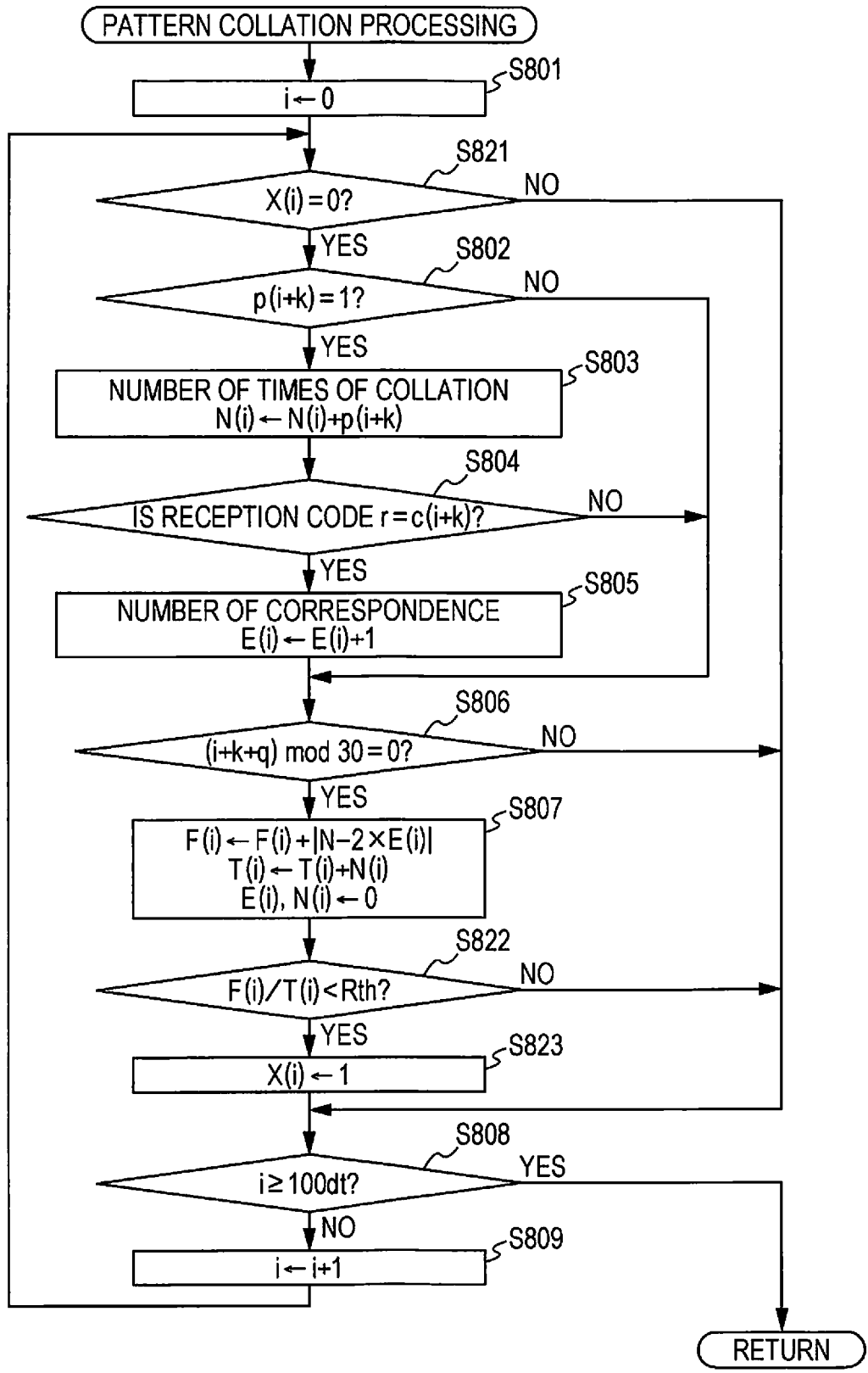
FIG. 11 is a flowchart of pattern collation processing invoked in the second modification example of the date-and-time information reception processing.

FIG. 10 is a flowchart illustrating the second modification example of the date-and-time information reception processing executed by the electronic clock 1. FIG. 11 is a flowchart of pattern collation processing invoked in this second modification example of the date-and-time information reception processing.

This date-and-time information reception processing is identical to the date-and-time information reception processing of the above embodiment except for a point that processing of step S221 and step S222 is added and processing of step S821 to step S823 is added to contents of pattern collation processing in step S209. The same code is assigned to identical processing contents and a description thereof is omitted.

When the pattern collation processing of step S209 is invoked and a value of an array number i is initialized in processing of step S801 as illustrated in FIG. 11, a module CPU 61 determines whether the candidate flag X(i) is 0 (step S821). When it is determined that the flag is 0 ("YES" in step S821), the processing by the module CPU 61 transitions to step S802. When it is determined that the flag is not 0, that is, the flag is 1, the processing by the module CPU 61 transitions to step S808.

When a matching degree F(i) and the accumulated value of collation T(i) are calculated and the number of correspondences E(i) and the number of times of collation N(i) are initialized in processing in step S807, the module CPU 61 determines whether a ratio of the matching degree F(i) to the accumulated value of collation T(i) is lower than a lower-limit reference value Rth (step S822). This determination processing may be performed only in a case where the accumulated value of collation T(i) is equal to or larger than a predetermined reference number Tth.

When it is determined that the ratio is lower than the lower-limit reference value Rth ("YES" in step S822), the module CPU 61 sets a candidate flag X(i) to 1 (step S823). Then, the processing by the module CPU 61 transitions to step S808. When it is determined that the ratio is not lower than the lower-limit reference value Rth ("NO" in step S822), the processing by the module CPU 61 transitions to step S808.

When the pattern collation processing is over and the processing goes back to the date-and-time information reception processing, as illustrated in FIG. 10, the module CPU 61 determines whether there is one remaining candidate flag X(i) that is "0" (step S221). When it is determined that there is not one remaining flag ("NO" in step S221), the processing by the module CPU 61 transitions to step S210. When it is determined that there is one remaining flag ("YES" in step S221), it is assumed that correspondence is acquired with a phase shift corresponding to the remaining one candidate flag X(i) and the processing by the module CPU 61 transitions to processing in step S214.

Also, when it is determined in determination processing of step S211 that reliability is not OK ("NO" in step S211), the module CPU 61 determines whether all candidate flags X(i) are 1 (step S222). When it is determined that all candidate flags X(i) are 1 ("YES" in step S222), the processing by the module CPU 61 transitions to step S216. When it is determined that any of the candidate flags X(i) is not 1 ("NO" in step S222), the processing by the module CPU 61 transitions to step S212.

Note that in a case of extracting the maximum matching degree Fmax and the second-largest matching degree Fmax2 in the reliability determination processing, a candidate flag X(i) may or may not include a matching degree F(i) related to an array number i of 1. After the candidate flag X(i) becomes 1, the matching degree F(i) is not increased. Thus, the matching degree F(i) is not newly selected as the maximum matching degree Fmax and the second-largest matching degree Fmax2. Thus, one with a lower processing load is selected between determining whether to include a matching degree F(i) in an object of extraction with reference to the candidate flag X(i) and uniformly including a matching degree F(i) in an object of extraction without reference to the candidate flag X(i).

As described above, the satellite radio-wave reception processing unit 60 included in the electronic clock 1 of the present embodiment includes the RF unit 64 to receive a radio wave that includes a code signal and that is transmitted from a satellite, the module CPU 61 as a processor in a demodulator which CPU identifies an array of a plurality of codes included in a code signal in the radio wave received by the RF unit 64 and reception timing of the array, the memory 62, the storage unit 63, the baseband conversion unit 65, the acquiring/tracking unit 66, and the like. Values of the plurality of codes, which values are determined according to contents indicated by the code signal, are respectively inverted for each word including 30 codes in accordance with parity data in a previous word of the word. As a collation code string generation unit, the processor in the demodulator generates a collation code string including an assumption code determined without consideration of inversion in accordance with contents assumed to be indicated by the code signal according to a type of a positioning satellite and reception timing related to the radio wave received by the RF unit 64. As a code identification unit, the processor identifies, as a reception code, each of the plurality of codes from the received radio wave. As a collation unit, the processor collates the assumption code in a deviation range, which is previously set with respect to reception timing of the identified reception codes, and the reception codes. As a result holding unit, the processor holds information about a collation result related to a correspondence or a noncorrespondence between the collated reception codes and the assumption code in each deviation amount in the deviation range with respect to the plurality of reception codes. As a matching determination unit, the processor determines one of correspondences and noncorrespondences, the number of which one is larger, as matching in each code block and calculates a matching degree F(i) corresponding to a value in which the number of times of matching in a plurality of words is integrated for each deviation amount. As a deviation amount identification unit, the processor identifies a deviation amount, in which the matching degree F(i) satisfies a predetermined matching condition, as a matching deviation amount.

In such a manner, in each assumption code of a collation code string, by determining that larger one of the number of correspondences and the number of noncorrespondences between the assumption code and reception codes is matching for each word without consideration of inversion of the codes, it is possible to appropriately count the number of times of matching with respect to the matching part. Also, in a part that is not matching, usually, the number of correspondences and the number of noncorrespondences are substantially the same. Thus, deviation is not made greatly and is within a range in which estimation of the number of times of matching does not become loose. Thus, it is not necessary to store and hold many collation code strings, which are generated across a plurality of words, according to a combination of inversion patterns and to perform collation of each thereof. Also, it is possible to identify a deviation amount between an accurate date and time and an assumed date and time efficiently with appropriate reception time, an appropriate processing load, and appropriate power consumption while reducing a memory capacity or a processing amount.

Also, a processor (deviation amount identification unit) in a demodulator calculates the accumulated value of collation T(i) that is the number of times of performance of collation counted for each deviation amount, that is, each array number i and identifies, with acquisition of a matching degree F(i) equal to the accumulated value of collation T(i) equal to or larger than a reference matching degree Fth being included in a matching condition, a deviation amount (array number i) in which a matching degree F(i), which satisfies the matching condition, as a matching deviation amount.

In such a manner, by specifying an array number i related to a deviation amount in which a reception code r equal to or larger than the reference matching degree Fth is completely matching with an assumption code, it is possible to easily and appropriately use a result of collation with an assumption code across a plurality of words. Accordingly, it is possible to identify a correct deviation amount while reducing a possibility of erroneous recognition of the deviation amount.

Also, the reference matching degree Fth is determined in such a manner that a matching probability that an assumption code and a reception code r are continuously matching for the number of times of collation equal to the reference matching degree Fth becomes lower than a predetermined reference value (such as 10-8). In such a manner, by determining the reference matching degree Fth stochastically, it is possible to identify a deviation amount in which a reception code r and an assumption code are completely matching with appropriate accuracy corresponding to intended accuracy required to the electronic clock 1.

Also, all probabilities that an assumption code and a reception code r are matching are calculated as ½ in a matching probability, whereby it is possible to identify a matching deviation amount with appropriate accuracy based on an average probability according to easy calculation.

Also, the processor in the demodulator calculates, as a collation unit, the accumulated value of collation T(i) that is the number of times of performance of collation counted for each deviation amount. As a deviation amount identification unit, the processor identifies a deviation amount (array number i), in which a maximum matching degree Fmax that satisfies the following matching condition is calculated, as a matching deviation amount. In the matching condition, a probability of occurrence P1 of the maximum matching degree Fmax (that is, minimum number of times of discordance Ebmin) with respect to the accumulated value of collation T(i) (maximum matching accumulated value of collation Tmax) in a deviation amount (array number i) in which a maximum matching degree F(i) (maximum matching degree Fmax) is calculated compared to the accumulated value of collation T(i) becomes equal to or lower than a predetermined reference value Pm compared to a probability of occurrence P2 of a second-largest matching degree Fmax2 (that is, second-smallest number of times of discordance Ebmin2) with respect to the second-largest matching accumulated value of collation Tmax2 that is the accumulated value of collation T(i) in a deviation amount (array number i) in which a second-largest matching degree F(i), that is, the second-largest matching degree Fmax2 is calculated.

In such a manner, even in a case where a reception code r and an assumption code are not completely matching due to a shortage of radio-wave received signal strength indicator, when possibility of erroneous recognition for matching with an assumption code of a collation code string c with a different deviation amount is adequately decreased stochastically, it is possible to appropriately identify a matching deviation amount that is determined to be correct. Thus, reception time is not unnecessarily increased. Also, even in a case where radio-wave received signal strength indicator is low, reception time becomes long, and the number of words is increased, a pattern of the collation code string c is not increased. Thus, a large storage capacity or processing of organizing an unnecessary patter in the middle is not necessary.

Also, the probability of occurrence P1 and the probability of occurrence P2 are calculated on the assumption that each of values "0" and "1" of a reception code r appears in a probability of ½. Thus, it is possible to eliminate possibility of erroneous identification with necessary accuracy based on a probability appropriate on average according to an easy calculation.

Also, identification of a matching deviation amount is performed each time a reception code r is specified and collated with an assumption code with one sub frame, which is 300 bits in 10 words, as the unit number of codes. Accordingly, matching determination is made appropriately for each word with respect to each deviation amount.

Also, the unit number of codes is set to 300 bits of one sub frame in a format of a navigation message of a GPS satellite. Thus, it is possible to perform identification of a deviation amount with the uniform accumulated value of collation T(i) without an influence of the number of assumption codes that varies for each word.

Also, the processor in the demodulator excludes a deviation amount, in which a relationship between the accumulated value of collation T(i) and the matching degree F(i) such as F(i)/T(i) does not satisfy a predetermined lower-limit standard that is, here, equal to or larger than 0.2, from a candidate of a matching deviation amount and stops at least one of counting of the accumulated value of collation T(i) and calculation of the matching degree F(i) in the deviation amount.

Accordingly, it is possible to decrease a load for an amount of processing related to an array number i that does not correspond to the matching deviation amount obviously. Thus, it is possible to decrease power consumption and to increase a speed of the processing.

Also, the processor in the demodulator excludes a deviation amount, in which a relationship between the accumulated value of collation T(i) and the matching degree F(i) does not satisfy the above-described predetermined lower-limit standard, from a candidate of a matching deviation amount and identifies, in a case where there is only one deviation amount that is not excluded from the candidate of the matching deviation amount, the one deviation amount as the matching deviation amount. In such a manner, in a case where there is only one deviation amount corresponding to a matching deviation amount according to an elimination method, it becomes possible to identify the matching deviation amount promptly even before stochastically-adequate data is calculated by the above-described method. Thus, it becomes possible to reduce processing and to improve a speed thereof. Note that in a case where received radio wave intensity is low and identification of a matching deviation amount is originally difficult, a reference value for received radio wave intensity or the like may be provided in such a manner that this method is not used.

Also, the processor in the demodulator receives an SNR related to received signal strength indicator of a radio wave from a positioning satellite at timing near identification timing of a first reception code and changes a matching condition according to the SNR. That is, in a case where identification of a matching deviation amount according to a complete correspondence is difficult from the beginning, it is possible to omit processing related to the complete correspondence from the beginning and to reduce the processing. Alternatively, a reference matching degree Fth or a reference value Pm may be changed.

Also, in a case where a matching degree F(i) that satisfies a matching condition is not calculated within predetermined time that is six seconds in one sub frame, the processor in the demodulator changes the matching condition. In such a manner, in a case where identification of a matching deviation amount according to a complete correspondence fails, it is possible to avoid an unnecessary increase in radio wave reception time or processing time or an increase in power consumption by promptly performing switching to identification of a matching deviation amount by reliability determination according to an incomplete correspondence based on calculated data without repeating similar processing. Also, in this case, a reference matching degree Fth or a reference value Pm may be changed.

Also, the processor in the demodulator generates an assumption propriety flag p(i) to identify whether each code c(i) of a collation code string c is an assumption code and collates, as a collation unit, a reception code r and the assumption code with reference to this assumption propriety flag p(i).

In such a manner, by providing each assumption propriety flag p(i), it is possible to easily determine an assumption code in the collation code string c and to perform collation. Thus, the processing becomes easy.

Each time a reception code r is identified, the processor in the demodulator collates the reception code with an assumption code in a deviation range. Also, the processor performs determination of matching and calculation of a matching degree F(i) for each deviation amount each time all assumption codes in a word are collated with the reception code r. Thus, it is possible to identify a matching deviation amount efficiently and promptly by dispersedly performing processing in real time within a possible range without concentrating or delaying processing unnecessarily.

Also, the electronic clock 1 of the present embodiment includes the above-described satellite radio-wave reception processing unit 60, the counter circuit 46 to count a date and time, the display 47 that performs a display based on the date and time counted by the counter circuit 46, and the host CPU 41. The demodulator calculates a current date and time on the basis of reception timing, which is assumed based on the date and time counted by the counter circuit 46, and a matching deviation amount. The host CPU 41 corrects the date and time counted by the counter circuit 46 according to the current date and time calculated by the processor in the demodulator.

In such a manner, it is possible to easily and appropriately keep the date and time counted by the counter circuit 46 an accurate date and time according to efficiently-calculated date-and-time information.

Also, the processor in the demodulator sets a deviation range based on the date and time counted by the counter circuit 46 and elapsed time from timing at which a date and time is corrected by the host CPU 41. Thus, in the electronic clock 1, by performing processing an amount of which corresponds to an appropriate deviation range with an easy deviation range setting, it is possible to calculated date-and-time information without an unnecessary load.

Also, by using the above-described information acquisition method related to time, it is possible to identify a deviation amount between an accurate date and time and an assumed date and time efficiently with appropriate reception time, an appropriate processing load, and appropriate power consumption.

Also, in the satellite radio-wave reception processing unit 60, by performing an control operation, which is related to time information acquisition, with a program 631 including the date-and-time information reception processing, it is possible to easily manage processing contents related to radio wave reception and time information acquisition and to identify a deviation amount between an accurate date and time and an assumed date and time efficiently with appropriate reception time, an appropriate processing load, and appropriate power consumption while reducing a memory capacity or a processing amount.

Note that the present invention is not limited to the above-described embodiment and various modifications can be made.

For example, in the above embodiment, collation with an assumption code in a deviation range is performed each time one reception code r is identified. However, collation and matching determination may be performed at once with respect to a plurality of reception codes corresponding to assumption codes of one word.

Also, in the above embodiment, a deviation range is set according to elapsed time from previous date-and-time correction. However, a different parameter, which may influence an error in a date and time, such as a temperature condition may be included in an object of consideration.

Also, in the above embodiment, stochastic elimination of erroneous identification in complete matching and incomplete matching and an elimination method are described and identification of a matching deviation amount is performed with a combination thereof. However, a different element may be considered. For example, according to contents, which are indicated by a code assumed to be discordant in a case of incomplete matching, such as a flag for trouble notification, identification processing of a matching deviation amount may be continued instead of being ended or may be performed again even when there is no problem stochastically. Also, even in a case where a matching deviation amount is identified when assumption codes and reception codes simply in one sub frame, instead of codes the number of which corresponds to a stochastic condition, are completely matching, an embodiment of the present invention can be applied.

Also, in the above embodiment, processing is performed separately with respect to complete matching and incomplete matching. However, determination of complete matching may be included in determination of incomplete matching. In this case, when a matching condition is not satisfied stochastically for a long time since a second-largest matching degree Fmax2 is also large although collation of a code equal to or larger than a reference matching degree Fth is performed and there is a maximum matching degree Fmax in which a matching degree F(i) and the accumulated value of collation T(i) become equal, identification of a matching deviation amount may be performed with a probability of occurrence P1=0 and the processing may be ended in the middle.

Also, in the above embodiment, a probability of occurrence of a code is simply set to ½. However, this is not the limitation. For example, the number of actually-identified codes may be reflected or it may be set to change a value according to a generation range of a collation code string, or the like.

Also, in the above embodiment, in identification of a matching deviation amount according to incomplete matching, processing is performed in reception and code identification of each one sub frame. However, when the necessary number of codes is collated in each deviation amount in a deviation range and matching determination is possible, the processing may be proceeded in the stage. Also, with respect to a part that becomes odd according to a deviation amount and reception time, that is, a part of code-identification starting time and ending time at which a collation code string to be collated is from a middle or in a middle of a word, matching determination may not be performed. Alternatively, with respect to the part of the ending time, collation may be kept performed until an end of a word is collated for each deviation amount.

Also, in the above embodiment, a standard or a method of matching determination is changed according to an SNR at timing of first code identification. However, for example, in a case where an SNR is decreased in the middle of code identification, the standard or method may be arbitrarily changed. Also, received signal strength indicator itself may be used as a standard instead of an SNR. Also, a standard or a method may be changed indirectly according to a variation in determination of a code type, which is received in each 1 msec, in 20 msec.

Also, in the above embodiment, a result of detection of a matching deviation amount is used for correction of a date and time counted by the counter circuit 46. However, this is not the limitation. Also, the satellite radio-wave reception processing unit 60 is not necessarily provided in a radio controlled watch, which mainly functions as a clock, and may be mounted in a different electronic device. Also, a unit included in the satellite radio-wave reception processing unit 60 may be traded alone.

Also, a case where the satellite radio-wave reception processing unit 60 outputs an accurate date and time to the host CPU 41 is not the limitation. Only deviation time information may be output to the host CPU 41 and the host CPU 41 may be made to change a date and time of the counter circuit 46 for the deviation time.

Also, a case of acquiring all pieces of date-and-time information is not the limitation. For example, only time information may be calculated.

Also, each operation executed and controlled by the module CPU 61 as a processor in the date-and-time information reception processing is not necessarily a software control operation based on the program 631 and a part or whole thereof may be performed by dedicated hardware including a dedicated logic (digital) circuit or an analog electronic circuit. For example, an operation of identifying a code may be performed by the acquiring/tracking unit 66 without control by the module CPU 61.

Also, in the above embodiment, a functional operation of the module CPU 61 as a processor in a demodulator and a functional operation of the host CPU 41 as a controller are described separately but may be integrally controlled by the same CPU.

Also, in the above embodiment, generation, collation, and matching determination of a collation code string c according to radio wave reception from a GPS satellite are performed. However, with respect to a positioning satellite according to a different positioning system such as GLONASS of Russia, Galileo of Europe, or MICHIBIKI of Japan, it is possible to effectively apply an embodiment of the present invention in a similar manner as long as a code signal is transmitted in a format in which inversion of a code may be generated in each predetermined number of bits.

Also, in the above description, the storage unit 63 including a non-volatile memory is described as an example of a computer-readable medium of an operation processing program for date-and-time information reception processing or the like related to a processing operation of the module CPU 61 according to an embodiment of the present invention. However, this is not the limitation. As a different computer-readable medium, a hard disk drive (HDD) or a portable recording medium such as a CD-ROM or a DVD can be applied. Also, as a medium to provide data of a program related to an embodiment of the present invention through a communication line, a carrier wave is also applied to an embodiment of the present invention.

Also, a detailed configuration, contents or a procedure of an operation, and the like described in the above embodiment can be arbitrarily modified within the spirit and the scope of the present invention.

Some embodiments of the present invention have been described. However, the scope of the present invention is not limited to the above-described embodiments and includes a scope of the invention described in claims and an equivalent scope thereof.

The invention claimed is:

1. A satellite radio-wave reception device comprising:
   a receiver configured to receive a radio wave including a code signal transmitted from a satellite; and
   a demodulator configured to:
      identify an array of a plurality of codes included in the code signal in the radio wave received by the receiver and reception timing of the array,
         wherein the plurality of codes is respectively inverted in a case where a value of each code determined according to contents indicated by the code signal corresponds to a predetermined condition in each code block including a predetermined number of codes;
      generate a collation code string including an assumption code determined without a consideration of the inversion in accordance with contents assumed to be indicated by the code signal according to a type of a satellite and reception timing related to the radio wave received by the receiver;
      identify, as a reception code, each of the plurality of codes from the received radio wave;
      collate the assumption code in a deviation range, which is previously set with respect to reception timing of the identified reception codes, and the reception codes;
      hold, with respect to the plurality of reception codes, information related to a collation result indicating a correspondence or a noncorrespondence between the collated reception codes and assumption code in each deviation amount in the deviation range;
      determine one of correspondences and noncorrespondences, the number of which one is larger, as matching in each code block and calculate the integrated value of matching corresponding to a value in which the number of times of matching in a plurality of code blocks is integrated with respect to each deviation amount; and
      identify a deviation amount, in which the integrated value of matching satisfies a predetermined matching condition, as a matching deviation amount.

2. The satellite radio-wave reception device according to claim 1,
   wherein the demodulator is configured to:
      calculate the integrated value of collation that is the number of times of performance of the collation counted for each deviation amount;
      include, in the matching condition, acquisition of the integrated value of matching equal to the integrated value of collation equal to or larger than the predetermined reference number of times of collation; and
      identify the deviation amount, in which the integrated value of matching that satisfies the matching condition is calculated, as the matching deviation amount.

3. The satellite radio-wave reception device according to claim 2,
   wherein the demodulator is configured to determine the reference number of times of collation in such a manner that a matching probability that the assumption code and the reception codes continuously become matching for the reference number of times of collation becomes lower than a predetermined reference value.

4. The satellite radio-wave reception device according to claim 3,
   wherein the demodulator is configured to calculate the matching probability with all probabilities that the assumption code and the reception codes become matching being ½.

5. The satellite radio-wave reception device according to claim 1,
   wherein the demodulator is configured to:
      calculate the integrated value of collation that is the number of times of performance of the collation counted for each deviation amount;
      include, in the matching condition, a first probability of occurrence of the maximum integrated value of matching with respect to the integrated value of collation in a deviation amount in which the maximum integrated value of matching is calculated compared to the integrated value of collation being equal to or lower than a predetermined reference ratio compared to a second probability of occurrence of the second-largest integrated value of matching with respect to the integrated value of collation in a deviation amount in which the second-largest integrated value of matching is calculated; and
      identify, the deviation amount, in which the maximum integrated value of matching that satisfies the matching condition is calculated, as the matching deviation amount.

6. The satellite radio-wave reception device according to claim 5, wherein the first probability of occurrence and the second probability of occurrence are values calculated on the assumption that each value of the reception codes emerges in a probability of ½.

7. The satellite radio-wave reception device according to claim 5, wherein identification of the matching deviation amount is performed each time reception codes in the unit number of codes corresponding to one or a plurality of code blocks are identified and collated with the assumption code.

8. The satellite radio-wave reception device according to claim 6, wherein identification of the matching deviation amount is performed each time reception codes in the unit number of codes corresponding to one or a plurality of code blocks are identified and collated with the assumption code.

9. The satellite radio-wave reception device according to claim 7, wherein the unit number of codes is the number of codes corresponding to a predetermined one cycle in a signal transmission format according to the satellite.

10. The satellite radio-wave reception device according to claim 5,
wherein the demodulator is configured to exclude a deviation amount, in which a relationship between the integrated value of collation and the integrated value of matching does not satisfy a predetermined lower-limit standard, from a candidate of the matching deviation amount, and stop at least one of counting of the integrated value of collation and calculation of the integrated value of matching in the deviation amount.

11. The satellite radio-wave reception device according to claim 5,
wherein the demodulator is configured to:
exclude a deviation amount, in which a relationship between the integrated value of collation and the integrated value of matching does not satisfy a predetermined lower-limit standard, from a candidate of the matching deviation amount; and
identify, in a case where there is only one deviation amount that is not excluded from the candidate of the matching deviation amount, the one deviation amount as the matching deviation amount.

12. The satellite radio-wave reception device according to claim 6,
wherein the demodulator is configured to:
exclude a deviation amount, in which a relationship between the integrated value of collation and the integrated value of matching does not satisfy a predetermined lower-limit standard, from a candidate of the matching deviation amount; and
identify, in a case where there is only one deviation amount that is not excluded from the candidate of the matching deviation amount, the one deviation amount as the matching deviation amount.

13. The satellite radio-wave reception device according to claim 1,
wherein the demodulator is configured to calculate a signal index value related to received signal strength indicator of the radio wave from the satellite at predetermined timing, and change the matching condition according to the signal index value.

14. The satellite radio-wave reception device according to claim 1,
wherein the demodulator is configured to change the matching condition in a case where the integrated value of matching that satisfies the matching condition is not calculated in predetermined upper-limit collation time.

15. The satellite radio-wave reception device according to claim 1,
wherein the demodulator is configured to:
generate identification information to identify whether each code of the collation code string is the assumption code; and
collate the reception codes and the assumption code with reference to the identification information.

16. The satellite radio-wave reception device according to claim 1,
wherein the demodulator is configured to:
collate, each time each of the reception codes is identified, the reception code with the assumption code in the deviation range; and
perform, with respect to each deviation amount, determination of matching and calculation of the integrated value of matching each time all assumption codes in the code block are collated with the reception code.

17. A radio controlled watch comprising:
the satellite radio-wave reception device according to claim 1;
a counter configured to count a date and time;
a display configured to perform a display based on the date and time counted by the counter; and
a controller,
wherein the demodulator is configured to calculate a current date and time based on the reception timing, which is assumed based on the date and time counted by the counter, and the matching deviation amount, and
wherein the controller is configured to correct the date and time counted by the counter according to the current date and time calculated by the demodulator.

18. The radio controlled watch according to claim 17,
wherein the demodulator is configured to set a deviation range based on the date and time counted by the counter and elapsed time from timing at which the date and time are corrected by the controller.

19. An information acquisition method comprising:
identifying an array of a plurality of codes, which is included in a code signal in a radio wave, transmitted from a satellite, received by a receiver, and reception timing of the array,
wherein the plurality of codes is respectively inverted in a case where a value of each code determined in accordance to contents indicated by the code signal corresponds to a predetermined condition in each code block including a predetermined number of codes;
generating a collation code string including an assumption code determined without a consideration of the inversion in accordance with contents assumed to be indicated by the code signal according to a type of a satellite and reception timing related to the radio wave received by the receiver;
identifying, as a reception code, each of the plurality of codes from the received radio wave;
collating the assumption code in a deviation range, which is previously set with respect to reception timing of the identified reception codes, and the reception codes;
holding, with respect to the plurality of reception codes, information related to a collation result indicating a correspondence or a noncorrespondence between the collated reception codes and assumption code in each deviation amount in the deviation range;
determining one of correspondences and noncorrespondences, the number of which one is larger, as matching in each code block and calculating the integrated value of matching corresponding to a value in which the number of times of matching in a plurality of code blocks is integrated with respect to each deviation amount; and identifying a deviation amount, in which the integrated value of matching satisfies a predetermined matching condition, as a matching deviation amount.

20. A non-transitory computer-readable recording medium that records a program, which causes a computer to perform processes comprising:

controlling a receiver to receive a radio wave including a code signal transmitted from a satellite;

identifying an array of a plurality of codes included in the code signal in the radio wave received by the receiver and reception timing of the array, wherein the plurality of codes is respectively inverted in a case where a value of each code determined according to contents indicated by the code signal corresponds to a predetermined condition in each code block including a predetermined number of codes;

generating a collation code string including an assumption code determined without a consideration of the inversion in accordance with contents assumed to be indicated by the code signal according to a type of a satellite and reception timing related to the radio wave received by the receiver;

identifying, as a reception code, each of the plurality of codes from the received radio wave;

collating the assumption code in a deviation range, which is previously set with respect to reception timing of the identified reception codes, and the reception codes;

holding, with respect to the plurality of reception codes, information related to a collation result indicating a correspondence or a noncorrespondence between the collated reception codes and assumption code in each deviation amount in the deviation range;

determining one of correspondences and noncorrespondences, the number of which one is larger, as matching in each code block and calculating the integrated value of matching corresponding to a value in which the number of times of matching in a plurality of code blocks is integrated with respect to each deviation amount; and identifying a deviation amount, in which the integrated value of matching satisfies a predetermined matching condition, as a matching deviation amount.

* * * * *